United States Patent
Mills et al.

(10) Patent No.: US 11,491,866 B2
(45) Date of Patent: Nov. 8, 2022

(54) EVAPORATIVE EMISSIONS FUEL TANK VENTING SYSTEM WITH PRESSURE RELIEF

(71) Applicant: Eaton Intelligent Power Limited, Dublin (IE)

(72) Inventors: Vaughn K. Mills, Chelsea, MI (US); Jeffrey B. Smith, Rochester Hills, MI (US); Dan L. Pifer, Chelsea, MI (US); Nikhil Nahar, Farmington, MI (US); Clark Fortune, Southfield, MI (US); Steve C. Holmquest, Manchester, MI (US); Sagar Dilip Pingale, Pune (IN); Curtis Moy, Oxford, MI (US)

(73) Assignee: Eaton Intelligent Power Limited, Dublin (IE)

(*) Notice: Subject to any disclaimer, the term of this patent is extended or adjusted under 35 U.S.C. 154(b) by 7 days.

(21) Appl. No.: 17/004,388

(22) Filed: Aug. 27, 2020

(65) Prior Publication Data

US 2020/0398661 A1    Dec. 24, 2020

Related U.S. Application Data

(63) Continuation of application No. PCT/EP2019/025055, filed on Feb. 27, 2019.
(Continued)

(30) Foreign Application Priority Data

Dec. 3, 2018  (IN) .............................. 201811045653
Dec. 14, 2018 (IN) .............................. 201811047398

(51) Int. Cl.
*B60K 15/035* (2006.01)
*F02M 25/08* (2006.01)
(Continued)

(52) U.S. Cl.
CPC .. *B60K 15/03519* (2013.01); *B60K 15/03504* (2013.01); *F02M 25/089* (2013.01);
(Continued)

(58) Field of Classification Search
CPC ............. F16K 31/047; F16K 31/52408; F16K 31/52425; F16K 31/52475; F16K 31/5286;
(Continued)

(56) References Cited

U.S. PATENT DOCUMENTS 5,931,182 A     8/1999  Craft et al.
6,604,539 B1 *  8/2003  Strohmayer ......... B60K 15/035
                                                    137/202
(Continued)

FOREIGN PATENT DOCUMENTS

DE          19540267 A1     4/1997
WO    WO-2016049320 A1 *   3/2016   ....... B60K 15/03519

OTHER PUBLICATIONS

International Search Report and Written Opinion for International Application No. PCT/EP2019/025055 dated May 17, 2019.

*Primary Examiner* — Atif H Chaudry
(74) *Attorney, Agent, or Firm* — RMCK Law Group PLC

(57) ABSTRACT

A vent shut-off assembly configured to manage venting on a fuel tank configured to deliver fuel to an internal combustion engine includes a first liquid vapor discriminator (LVD), a main housing, a first poppet valve assembly, a pump and an actuator assembly. The first LVD is disposed in the fuel tank. The main housing selectively vents to a carbon canister. The first poppet valve assembly has a first poppet valve arranged in the main housing. The pump selectively pumps liquid fuel from the main housing. The actuator assembly is at least partially housed in the main housing and includes a cam assembly having a cam shaft that includes a first cam (Continued)

and a second cam. The first cam has a profile that one of opens and closes the first poppet valve fluidly coupled to the first LVD.

20 Claims, 23 Drawing Sheets

Related U.S. Application Data

(60) Provisional application No. 62/644,864, filed on Mar. 19, 2018, provisional application No. 62/636,226, filed on Feb. 28, 2018.

(51) Int. Cl.
*F16K 31/524* (2006.01)
*F16K 31/04* (2006.01)
*F16K 31/528* (2006.01)
*B60K 15/03* (2006.01)

(52) U.S. Cl.
CPC ....... *F02M 25/0836* (2013.01); *F16K 31/047* (2013.01); *F16K 31/5245* (2013.01); *F16K 31/5286* (2013.01); *F16K 31/52408* (2013.01); *F16K 31/52425* (2013.01); *F16K 31/52475* (2013.01); *B60K 2015/03243* (2013.01); *B60K 2015/03263* (2013.01); *B60K 2015/03514* (2013.01); *B60K 2015/03523* (2013.01); *B60K 2015/03576* (2013.01); *B60K 2015/03585* (2013.01); *F02M 2025/0863* (2013.01)

(58) Field of Classification Search
CPC .......... F16K 31/5245; B60K 15/03519; B60K 2015/03523; B60K 2015/03557; B60K 15/035; B60K 2015/03585; B60K 15/03504; B60K 2015/03514; B60K 2015/03576; F02M 25/089; F02M 25/0836; F02M 2025/0863
See application file for complete search history.

(56) References Cited

U.S. PATENT DOCUMENTS

| | | | |
|---|---|---|---|
| 2005/0016625 A1* | 1/2005 | Aschoff | ........... B60K 15/03519 141/302 |
| 2009/0293849 A1* | 12/2009 | Kito | ...................... F02M 37/20 123/520 |
| 2017/0328311 A1 | 11/2017 | Franklin et al. | |
| 2018/0050587 A1* | 2/2018 | Qin | ........................ B60K 15/05 |
| 2018/0087475 A1* | 3/2018 | Mills | ................ B60K 15/03519 |
| 2018/0328515 A1* | 11/2018 | Steffen | .................. F16K 31/126 |

* cited by examiner

| Normal Operation | Poppet Position | Cam Lobe Position |
|---|---|---|
| | Full Open | High |
| | Vapor Venting To Canister | |

| OPR Open | Poppet Position | Cam Lobe Position |
|---|---|---|
| | Close | Low |
| | Vapor Venting To Canister ||

| OVR Open | Poppet Position | Cam Lobe Position |
|---|---|---|
| | Open | Low |
| | Vapor entering into fuel tank | |

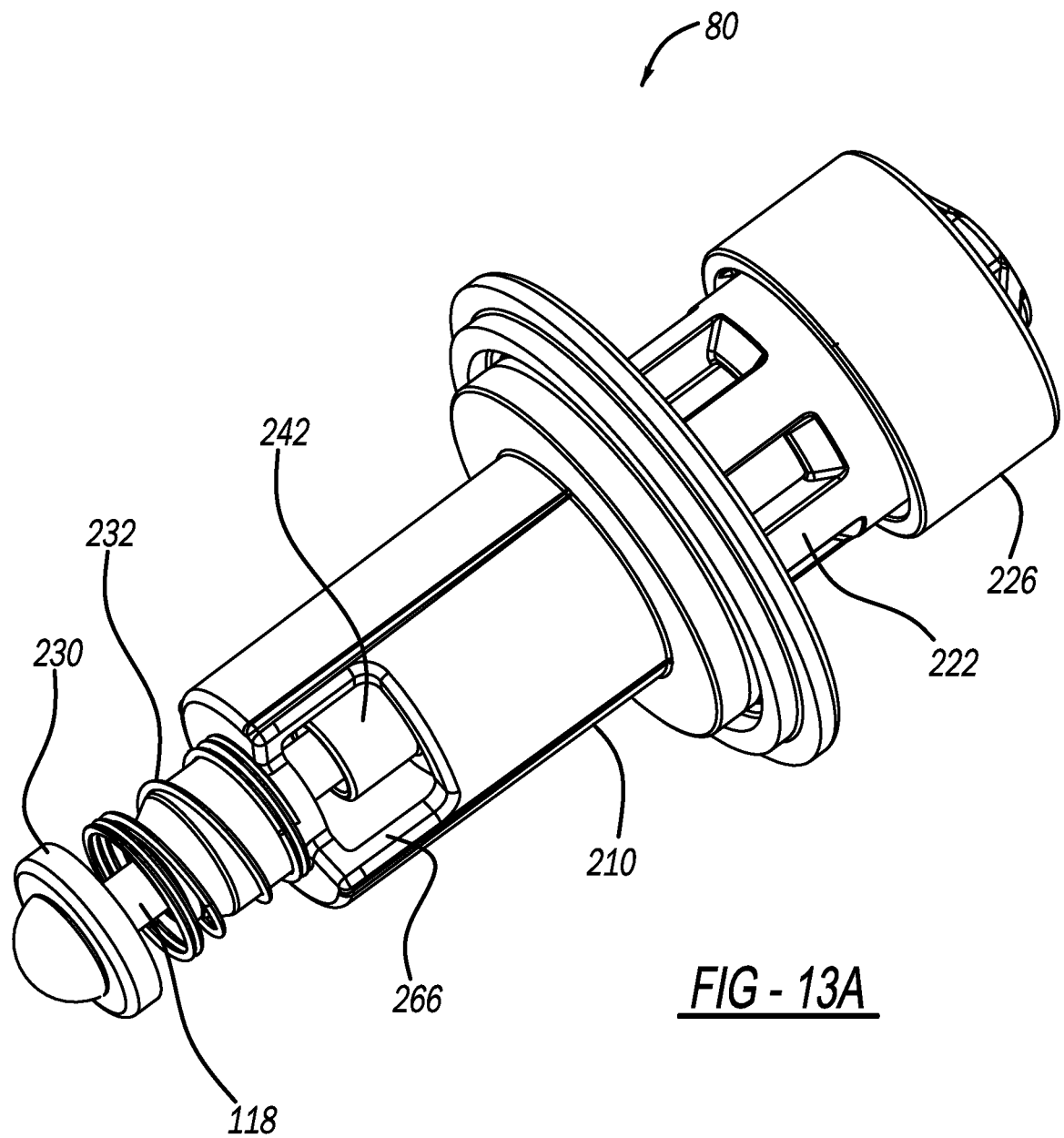

EVAPORATIVE EMISSIONS FUEL TANK VENTING SYSTEM WITH PRESSURE RELIEF

CROSS REFERENCE TO RELATED APPLICATION

This application is a continuation of International Application No. PCT/EP2019/025055 filed Feb. 27, 2019, which claims the benefit of U.S. Provisional Application No. 62/636,226 filed Feb. 28, 2018; U.S. Provisional Application No. 62/644,864 filed Mar. 19, 2018; Indian Provisional Application No. 201811045653 filed Dec. 3, 2018; and Indian Provisional Application No. 201811047398 filed Dec. 14, 2018, the contents of which are incorporated herein by reference thereto.

FIELD

The present disclosure relates generally to fuel tanks on passenger vehicles and more particularly to a fuel tank having an electronically controlled module that manages the complete evaporative system for the vehicle, the fuel tank venting system having a cam operated venting system and over pressure relief.

BACKGROUND

Fuel vapor emission control systems are becoming increasingly more complex, in large part in order to comply with environmental and safety regulations imposed on manufacturers of gasoline powered vehicles. Along with the ensuing overall system complexity, complexity of individual components within the system has also increased. Certain regulations affecting the gasoline-powered vehicle industry require that fuel vapor emission from a fuel tank's ventilation system be stored during periods of an engine's operation. In order for the overall vapor emission control system to continue to function for its intended purpose, periodic purging of stored hydrocarbon vapors is necessary during operation of the vehicle. In fuel tanks configured for use with a hybrid powertrain it is also necessary to properly vent the fuel tank. Such fuel tanks need to account for high pressures and can incorporate an over pressure relief (OPR) and over vacuum relief (OVR). Moreover, it may also be necessary to provide a means for OVR in a conventional gasoline fuel tank system.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A vent shut-off assembly configured to manage venting on a fuel tank configured to deliver fuel to an internal combustion engine includes a first liquid vapor discriminator (LVD), a main housing, a first poppet valve assembly, a pump and an actuator assembly. The first LVD is disposed in the fuel tank. The main housing selectively vents to a carbon canister. The first poppet valve assembly has a first poppet valve arranged in the main housing. The pump selectively pumps liquid fuel from the main housing. The actuator assembly is at least partially housed in the main housing and includes a cam assembly having a cam shaft that includes a first cam and a second cam. The first cam has a profile that one of opens and closes the first poppet valve fluidly coupled to the first LVD, wherein when the first poppet valve is in a closed position, vapor is precluded from passing from the fuel tank to the carbon canister. When the first poppet valve is in an open position, vapor is permitted from passing from the fuel tank to the carbon canister.

According to additional features, the vent shut-off assembly further includes a second LVD disposed in the fuel tank. A first vapor tube can be fluidly connected between the first LVD and the main housing. A second vapor tube can be fluidly connected between the second LVD and the main housing. The main housing can include a vent line port. The first and second vapor tubes can be fluidly coupled to the vent line port. In one example, the first and second vapor tube can merge at a union. The main housing can include a canister line port that is fluidly connected to the carbon canister. The actuator assembly can further include a motor that selectively rotates the cam assembly based on operating conditions. The cam assembly can further include a second cam that selectively engages a pump causing the pump to pump liquid fuel out of the housing. The first cam can include a cam surface having a generally high lift surface and a low lift surface. The first poppet valve assembly includes a first poppet, a carrier that supports the first poppet and a disk that supports a seal member and a pin that selectively engages the first cam.

In other features, the poppet valve assembly includes a first biasing member biased between the first poppet and the carrier. A second biasing member is biased between the disk and the retainer. A third biasing member is biased between the retainer and the collar fixed to the pin. The vent shut-off assembly operates during normal operation between a fully open position and a fully closed position. In the fully open position the first cam rotates to a position wherein the high lift surface urges the pin to be depressed causing the first poppet to be lifted off of sealing engagement with an inner lip seal of the seal member. In the fully closed position, the first cam rotates to a position wherein the low lift surface is aligned with the pin wherein the third biasing member urges the pin to retract away from the first poppet and attains a sealing engagement with the inner lip seal of the seal member.

According to other features, the vent shut-off assembly operates during an over pressure relief (OPR) event wherein pressure within the fuel tank is great enough to cause the seal member to be lifted off of a sealed position with the carrier allowing vapor to pass from the fuel tank to the carbon canister. The vent shut-off assembly can operate during an over vacuum relief (OVR) event wherein pressure within the fuel tank has dropped low enough to cause a vacuum wherein the first poppet is lifted off of a sealing engagement with the inner lip seal of the seal member allowing vapor to pass into the fuel tank. A second poppet valve assembly can have a second poppet valve arranged in the main housing. The cam assembly includes a second cam having a profile that one of opens and closes the second poppet valve fluidly coupled to the second LVD. A third poppet valve assembly can have a third poppet valve arranged in the main housing. A third cam can be arranged on the cam assembly that includes a profile that one of opens and closes the third poppet valve fluidly coupled to the third LVD. The second and third poppet valve assemblies both selectively and alternatively operate to relieve pressure in an over pressure relief (OPR) event and an over vacuum relief (OVR) event.

A vent shut-off assembly configured to manage venting in a fuel tank configured to deliver fuel to an internal combustion engine according to another example of the present disclosure includes a main housing, a first vent opening, a second vent opening, a poppet valve assembly and an actuator. The main housing selectively vents to a carbon canister. The first vent opening is disposed in the fuel tank and is fluidly coupled to the main housing through a first vapor tube. The second vent opening is disposed in the fuel tank and is fluidly coupled to the main housing through a second vapor tube. The poppet valve assembly has a poppet valve arranged in the main housing. The poppet valve is fluidly coupled to a vent line port that fluidly connects the first and second vapor tubes. The actuator assembly is at least partially housed in the main housing. The actuator assembly includes a cam assembly having a cam shaft that includes a first cam having a profile that one of opens and closes the poppet valve. When the poppet valve is in a closed position, vapor is precluded from passing from the fuel tank to the carbon canister. When the poppet valve is in an open position, vapor is permitted from passing from the fuel tank to the carbon canister.

A vent shut-off assembly configured to manage venting on a fuel tank system configured to deliver fuel to an internal combustion engine according to another example of the present disclosure includes a carbon canister and an actuator assembly. The carbon canister is adapted to collect fuel vapor emitted by the fuel tank and to subsequently release the fuel vapor to the engine. The actuator assembly includes a motor drive that rotates a camshaft having at least a first cam and a second cam disposed in a housing. The actuator assembly has a first plunger assembly and a second plunger assembly. The first plunger assembly selectively fluidly connects the fuel tank and the carbon canister. The second plunger assembly selectively fluidly connects the fuel tank and the carbon canister. One of an over pressure relief (OPR) valve and over vacuum relief (OVR) valve is configured at the first plunger assembly.

In other features, the vent shut-off assembly further comprises a third cam provided on the camshaft and a third plunger assembly that selectively fluidly connects the fuel tank the carbon canister. The first plunger assembly comprises a stem assembly, a roller, a plunger housing, a first biasing member and a collar. The stem assembly can include a seal disposed around the stem body. The first plunger can include an OPR check valve having a ball, a second biasing member and a disk. The seal of the stem assembly can be normally sealed against the seat on the plunger housing. The first biasing member can be configured to urge the collar in a first direction thereby urging the stem body in the first direction and moving the seal against the seat.

According to other features, the plunger assembly is configured to open by moving the stem assembly in a second direction, opposite the first direction, urging the seal off of the seat upon a threshold pressure building against the collar that overcomes a bias of the first biasing member. The OPR check valve can be configured to open upon a predetermined pressure being reached in the vapor dome. The ball can urge the second biasing member in the second direction upon the predetermined pressure being reached. The ball moves off of a ball seat on the stem body allowing fuel vapor to be relieved from the vapor dome of the fuel tank through a passage defined in the stem body. In one example, the fuel tank system is pressurized. In another example, the fuel tank system can be configured for use on a hybrid powertrain vehicle.

BRIEF DESCRIPTION OF THE DRAWINGS

The present disclosure will become more fully understood from the detailed description and the accompanying drawings, wherein:

FIG. 13A is a perspective view of the pump;

DETAILED DESCRIPTION

Figure 1:
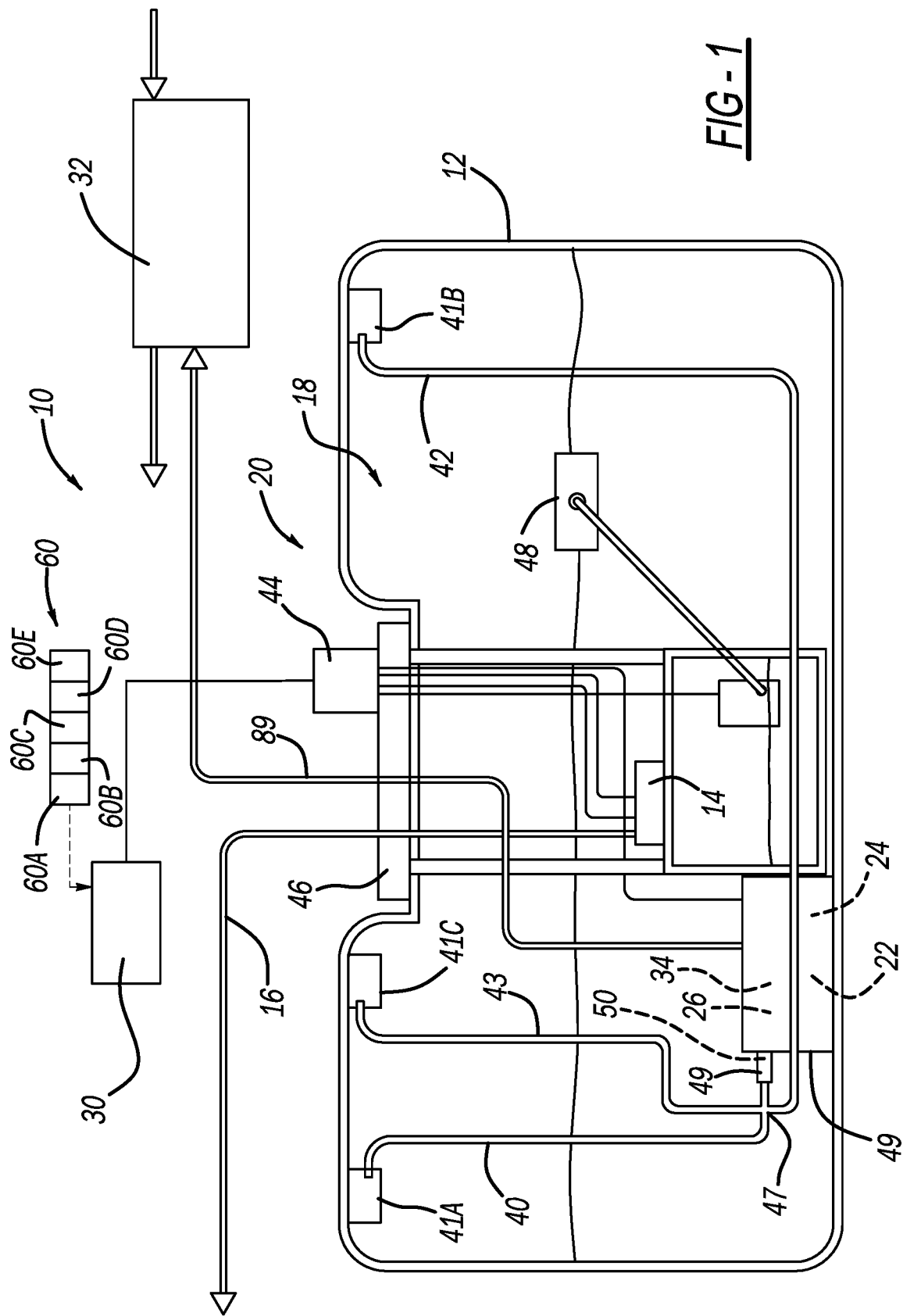
FIG. 1 is a schematic illustration of a fuel tank system having an evaporative emissions control system including a vent shut-off assembly, a controller, an electrical connector and associated wiring in accordance to one example of the present disclosure.

With initial reference to FIG. 1, a fuel tank system constructed in accordance to one example of the present disclosure is shown and generally identified at reference number 10. The fuel tank system 10 can generally include a fuel tank 12 configured as a reservoir for holding fuel to be supplied to an internal combustion engine via a fuel delivery system, which includes a fuel pump 14. The fuel pump 14 can be configured to deliver fuel through a fuel supply line 16 to a vehicle engine. The fuel tank 12 can define a vapor dome 18 generally at an upper portion of the fuel tank 12. An evaporative emissions control system 20 can be configured to recapture and recycle the emitted fuel vapor. As will become appreciated from the following discussion, the evaporative emissions control system 20 provides an electronically controlled module that manages the complete evaporative system for a vehicle.

The evaporative control system 20 provides a universal design for all regions and all fuels. In this regard, the requirement of unique components needed to satisfy regional regulations may be avoided. Instead, software may be adjusted to satisfy wide ranging applications. In this regard, no unique components need to be revalidated saving time and cost. A common architecture may be used across vehicle lines. Conventional mechanical in-tank valves may be replaced. As discussed herein, the evaporative control system 20 may also be compatible with pressurized systems including those associated with hybrid powertrain vehicles.

The evaporative emissions control system 20 includes a vent shut-off assembly 22, a manifold assembly 24, a liquid trap 26, a control module 30, a purge canister 32, a first vapor tube or vent line 40, a second vapor tube or vent line 42, a third vapor tube or vent line 43, an electrical connector 44, a fuel delivery module (FDM) flange 46 and a fuel fill level sensor assembly such as a float level sensor assembly 48. The first vapor tube 40 can terminate at a vent opening or liquid vapor discriminating (LVD) valve 41A arranged at a top corner of the fuel tank 12. Similarly, the second vapor tube 42 can terminate at a vent opening or LVD valve 41B arranged at a top corner of the fuel tank 12. The third vapor tube 43 can terminate at a vent opening or LVD valve 41C arranged at a top of the fuel tank 12. All of the vent openings 41A-41C can terminate at a vapor dome 18. Each of the LVD valves 41A, 41B and 41C are configured to permit vapor to pass from the vapor space 18 to the vent shut-off assembly 22 while inhibiting liquid fuel from entering and passing into the vent shut-off assembly.

In one configuration, the first, second and third vapor tubes 40, 42 and 43 can merge at a union 47. From the union 47, a vent line connection 49 connects with vent line port 50 defined on the vent shut-off assembly 22. In other examples, some or all of the vapor tubes 41, 42 and 43 can have a dedicated input port into the vent shut-off assembly 22. In one example, the manifold assembly 24 can be defined within the vent shut-off assembly 22 downstream of the vent line port 50 (or equivalent porting that accepts the respective vapor tubes 41, 42 and 43).

As will become appreciated from the following discussion, the vent shut-off assembly 22 can take many forms. In the examples discussed herein, the vent shut-off assembly 22 has an actuator assembly that is configured as a cam actuated system. However, other configurations suitable to selectively open and close vent line port 50 are contemplated including, but not limited to, other mechanical systems, solenoid systems, hydraulic systems, magnetic systems and combinations thereof.

The control module 30 can further include or receive inputs from system sensors, collectively referred to at reference 60. The system sensors 60 can include a tank pressure sensor 60A that senses a pressure of the fuel tank 12, a canister pressure sensor 60B that senses a pressure of the canister 32, a temperature sensor 60C that senses a temperature within the fuel tank 12, a tank pressure sensor 60D that senses a pressure in the fuel tank 12 and a vehicle grade sensor and or vehicle accelerometer 60E that measures a grade and/or acceleration of the vehicle. It will be appreciated that while the system sensors 60 are shown as a group, that they may be located all around the fuel tank system 10. The control module 30 can additionally include fill level signal reading processing, fuel pressure driver module functionality and be compatible for two-way communications with a vehicle electronic control module (not specifically shown).

The vent shut-off assembly 22 can be configured to control a flow of fuel vapor between the fuel tank 12 and the purge canister 32. The purge canister 32 is adapted to collect fuel vapor emitted by the fuel tank 12 and to subsequently release the fuel vapor to the engine. The control module 30 can also be configured to regulate the operation of evaporative emissions control system 20 in order to recapture and recycle the emitted fuel vapor. The float level sensor assembly 48 can provide fill level indications to the control module 30. As will become appreciated from the following discussion, the control module 30 can send signals to the vent shut-off assembly 22 based on operating conditions such as provided by the sensors 60 to open and close venting from the fuel tank 12 to the purge canister 32.

Figure 2:
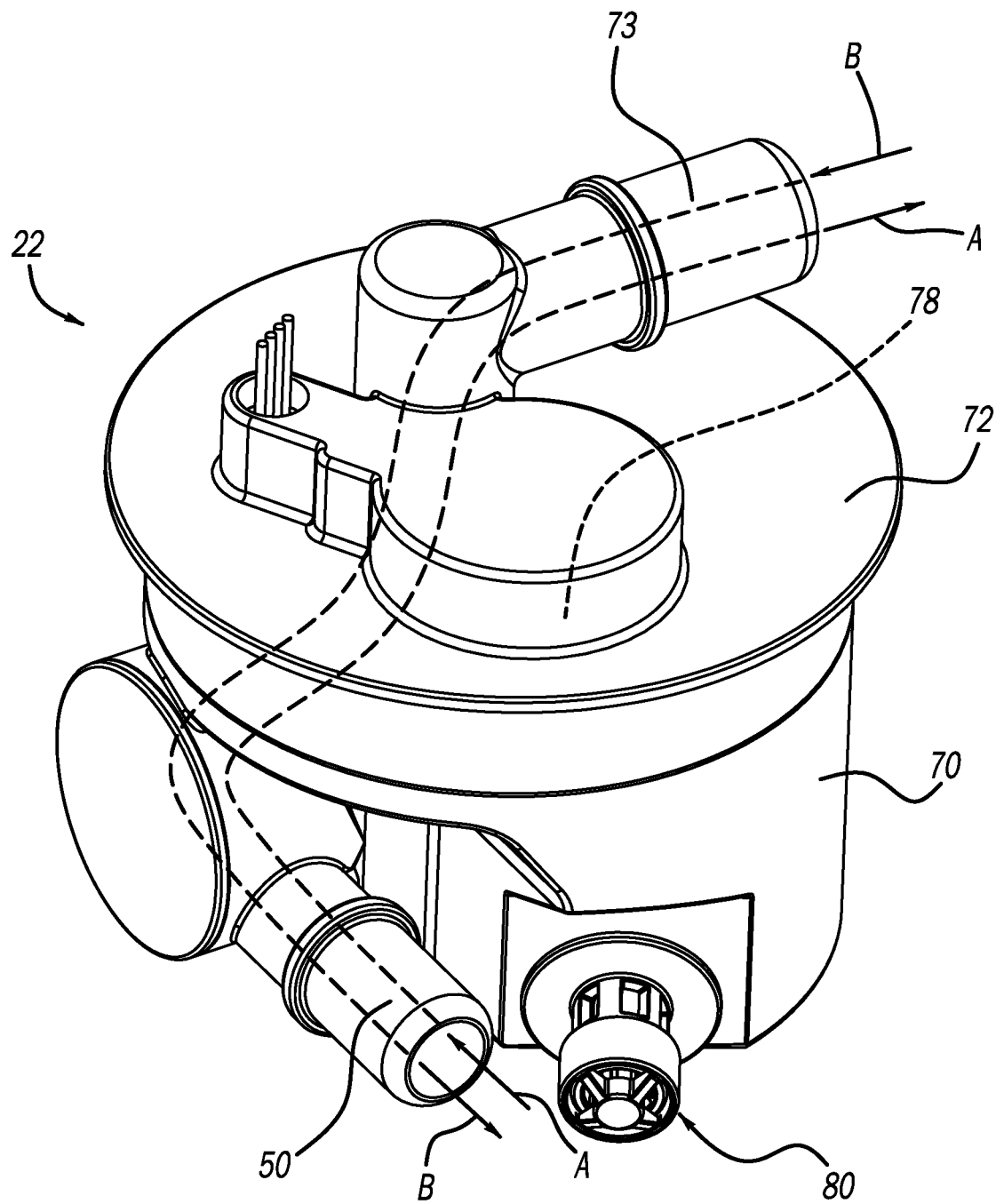
FIG. 2 is a front perspective view of an evaporative emissions control system including a vent shut-off assembly configured with solenoids according to one example of the present disclosure.
Figure 3:
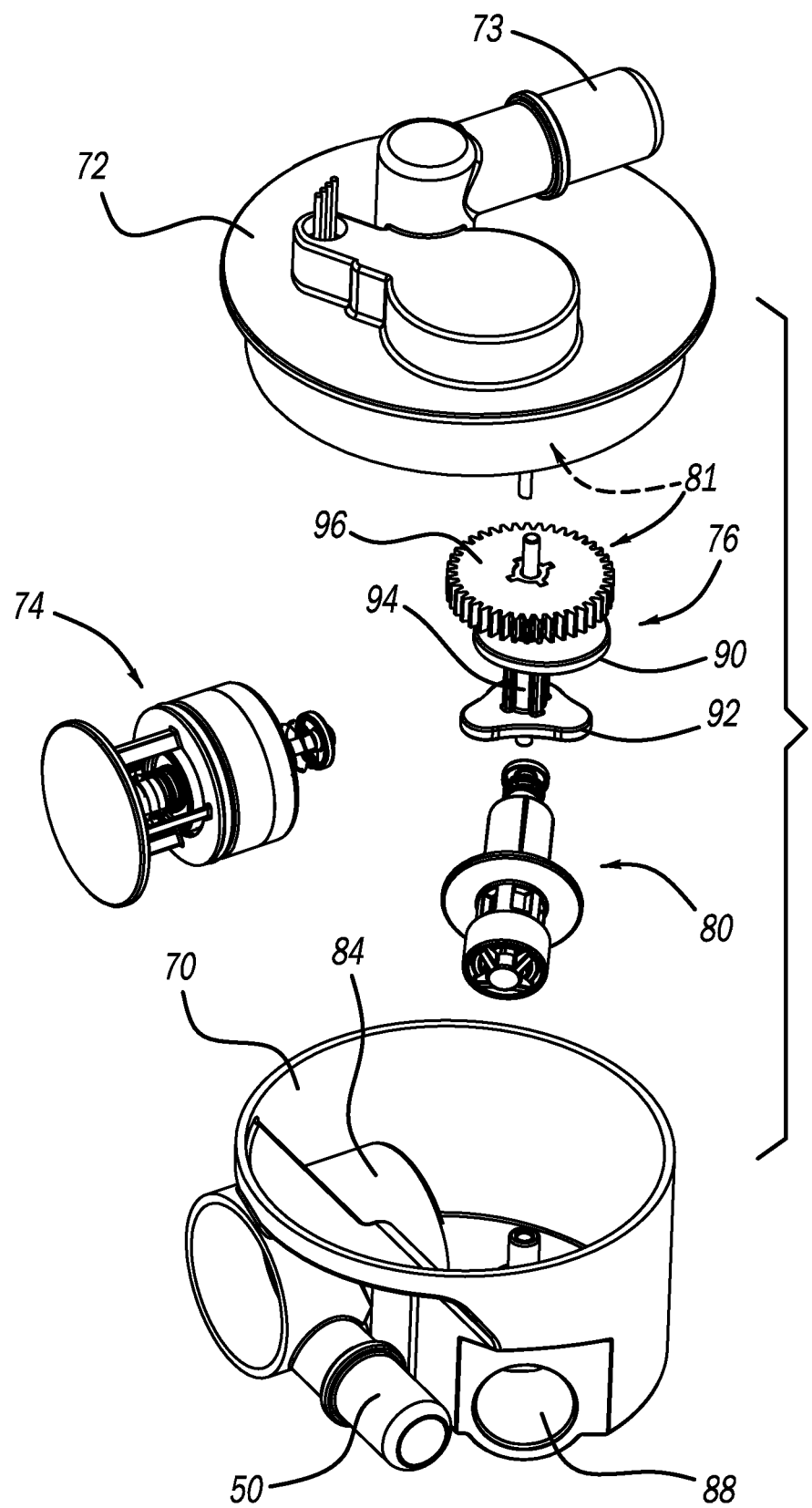
FIG. 3 is an exploded view of the evaporative emissions control system of FIG. 2.

With additional reference to FIGS. 2 and 3, the vent shut-off assembly 22 will be further described. The vent shut-off assembly 22 generally comprises a main housing 70, a top housing 72 having a canister line port 73, a poppet valve assembly 74, a cam assembly 76, a motor 78 and a pump 80. The motor 78 and the cam assembly 76 can collectively define an actuator assembly 81. The main housing 70 and the top housing 72 can collectively define a chamber that includes the manifold assembly 24. The main housing 70 can define a poppet assembly receiving bore 84 and a pump outlet opening 88. The poppet assembly receiving bore 84 leads to the vent line port 50 and receives the poppet valve assembly 74. The pump outlet opening 88 generally mounts the pump 80 and provides an outlet for pumping liquid out of the main housing 70 as will be described in detail herein. A vent line 89 can be fluidly connected between the canister line port 73 of the vent shut-off assembly 22 and the canister 32.

Figure 8A:
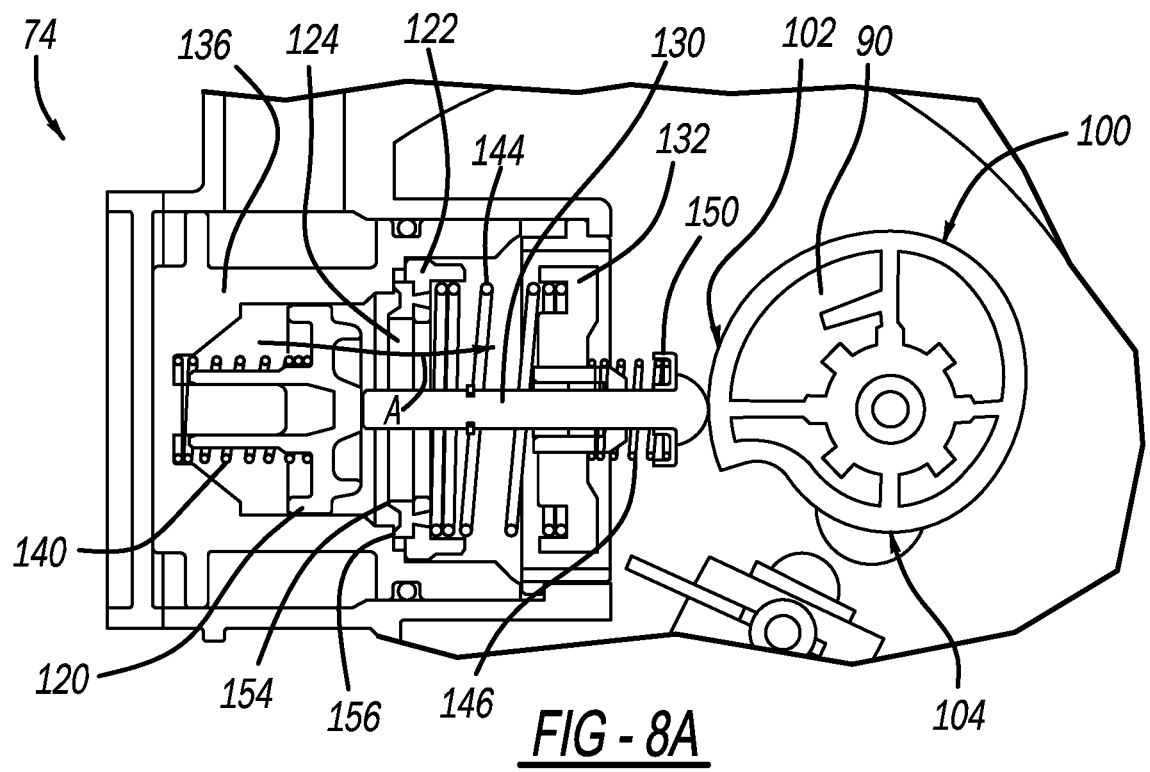
FIG. 8A is a first cross-sectional view of the poppet assembly during the conditions shown in FIGS. 4A and 4B.
Figure 8B:
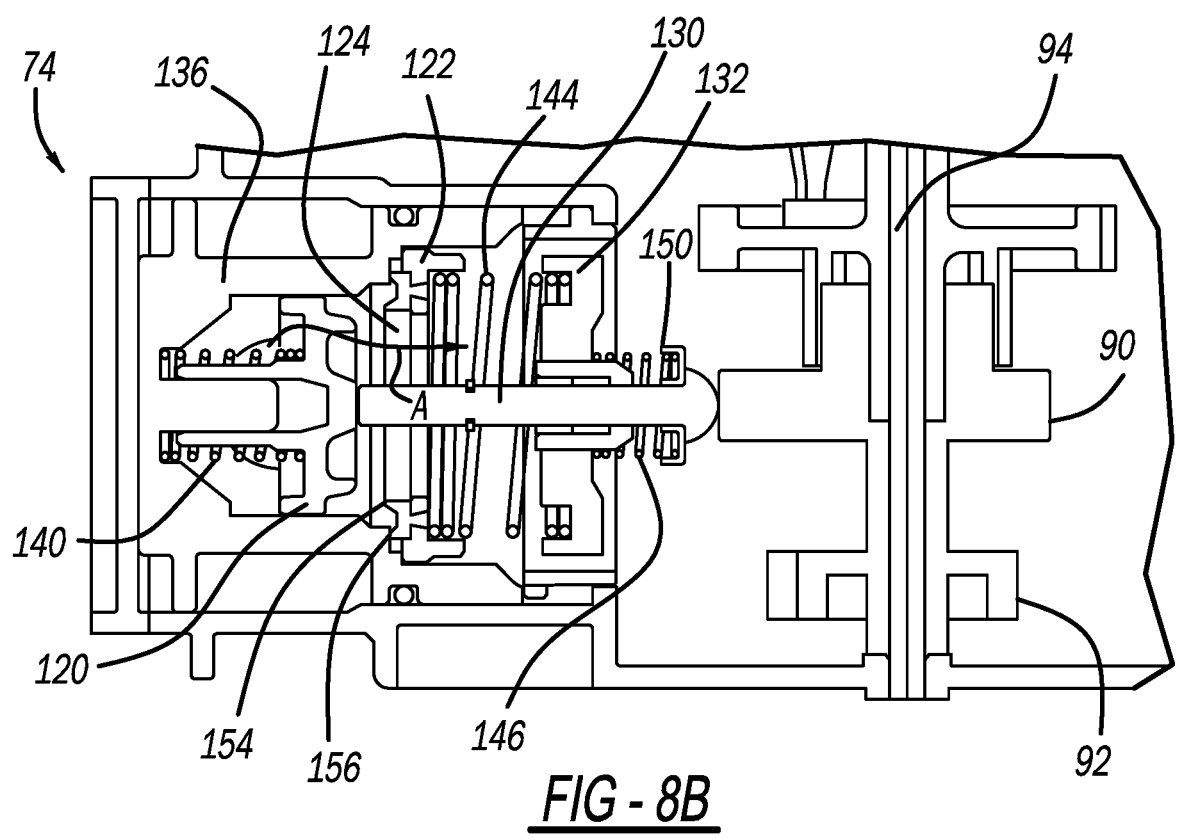
FIG. 8B is a second cross-sectional view of the poppet assembly during the conditions shown in FIGS. 4A and 4B.
Figure 9A:
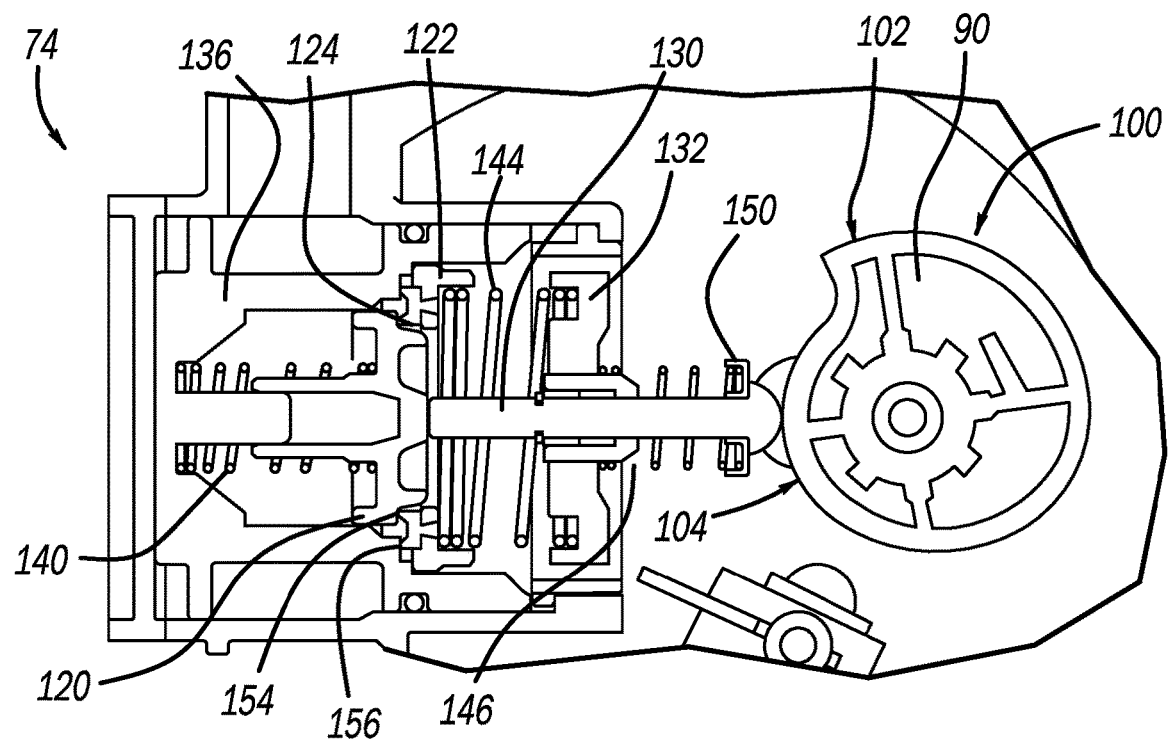
FIG. 9A is a first cross-sectional view of the poppet assembly during the conditions shown in FIGS. 5A and 5B.
Figure 9B:
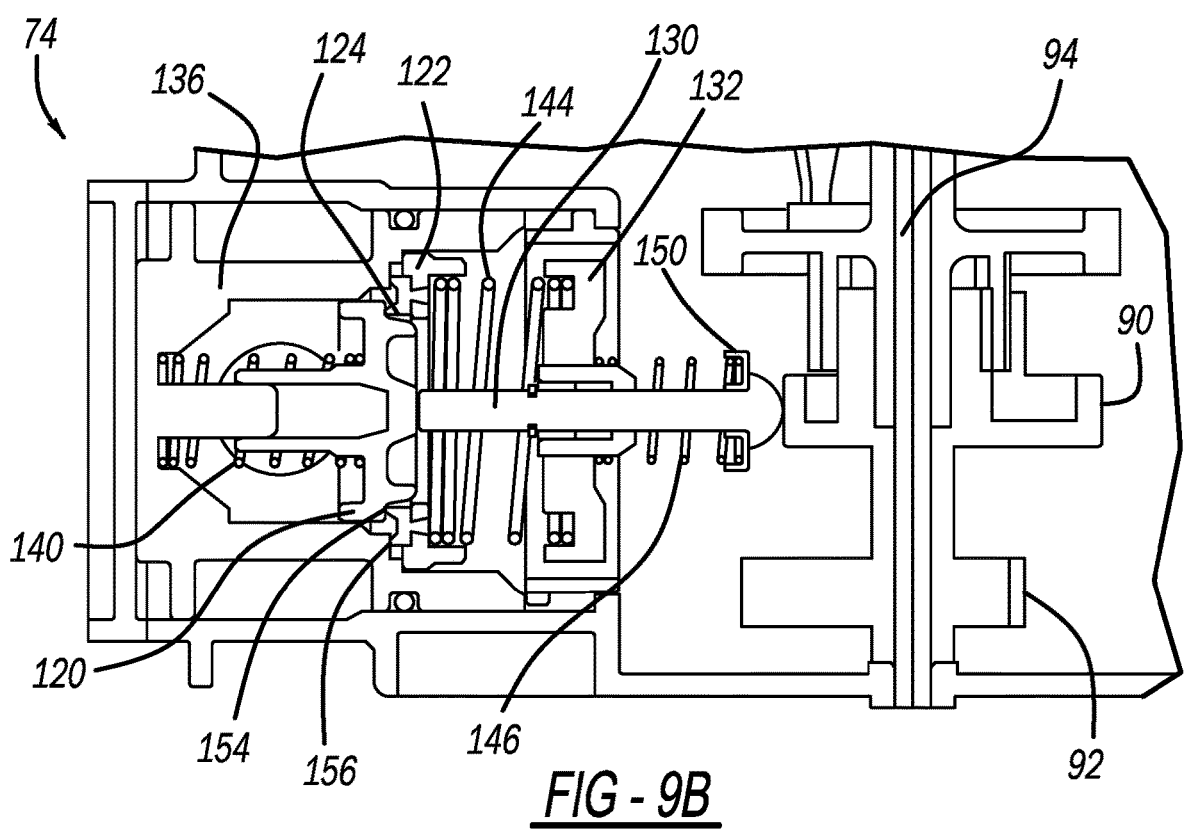
FIG. 9B is a second cross-sectional view of the poppet assembly during the conditions shown in FIGS. 5A and 5B.
Figure 10A:
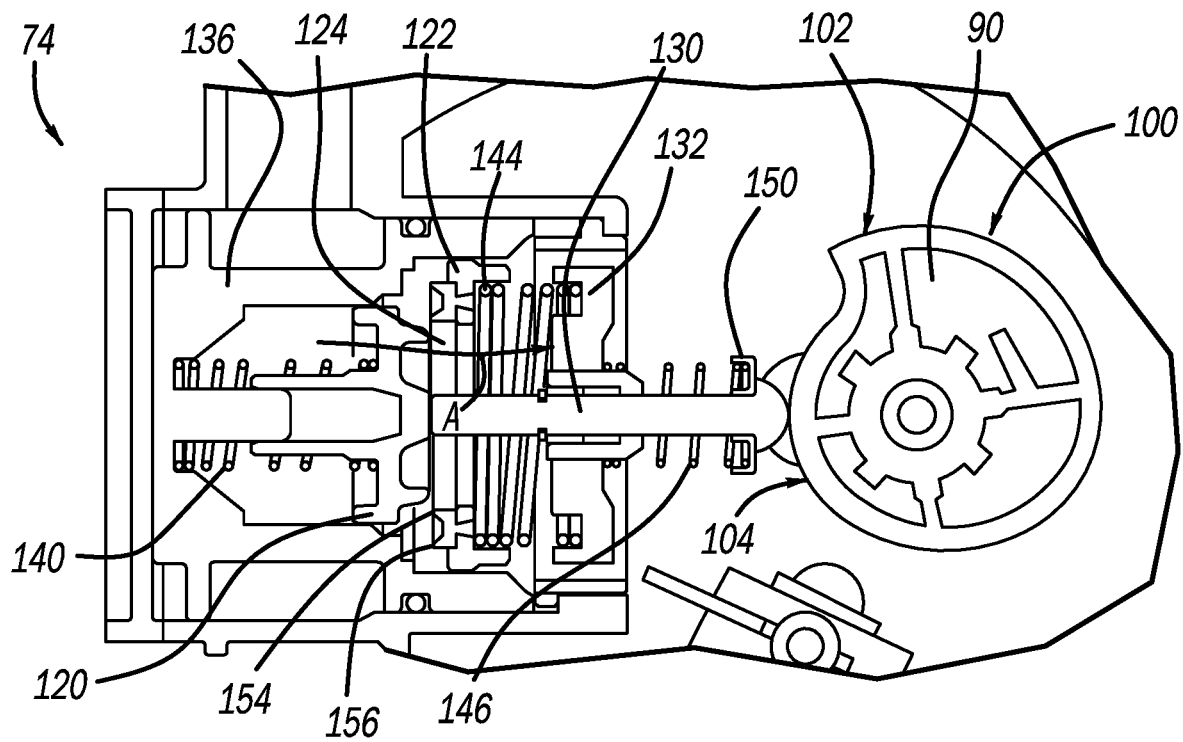
FIG. 10A is a first cross-sectional view of the poppet assembly during the conditions shown in FIGS. 6A and 6B.
Figure 10B:
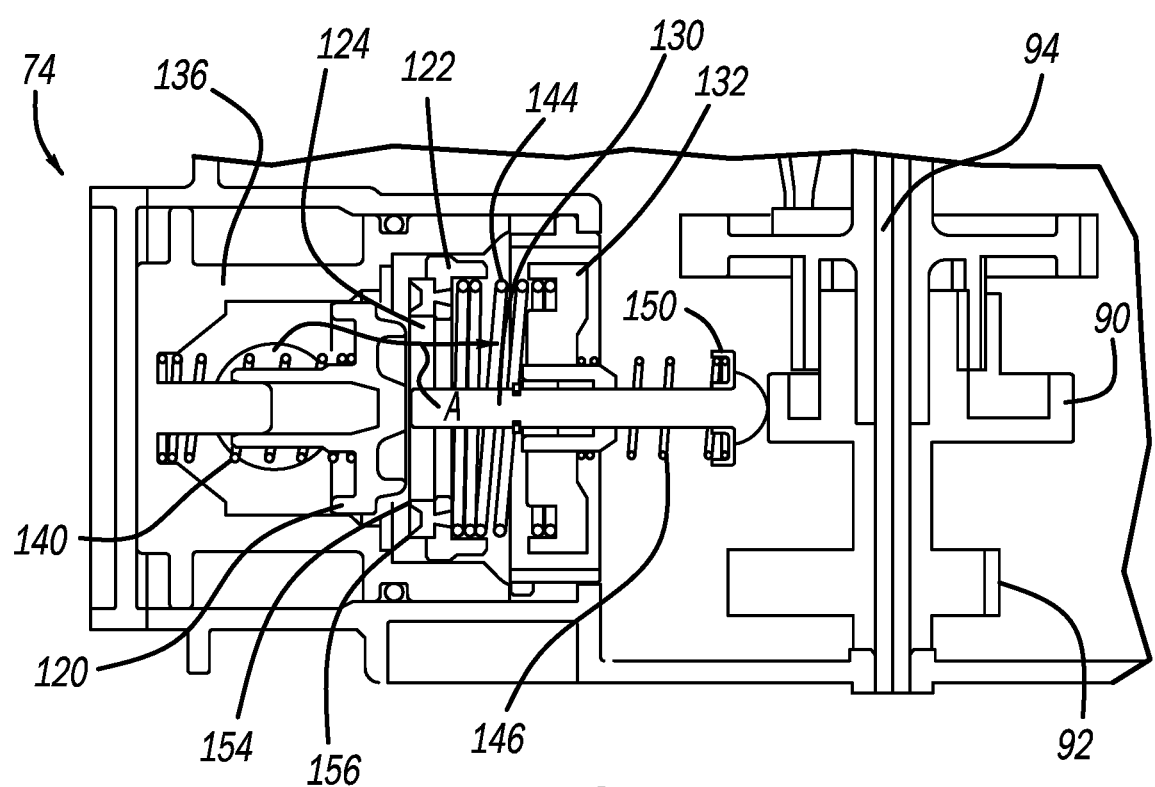
FIG. 10B is a second cross-sectional view of the poppet assembly during the conditions shown in FIGS. 6A and 6B.
Figure 11A:
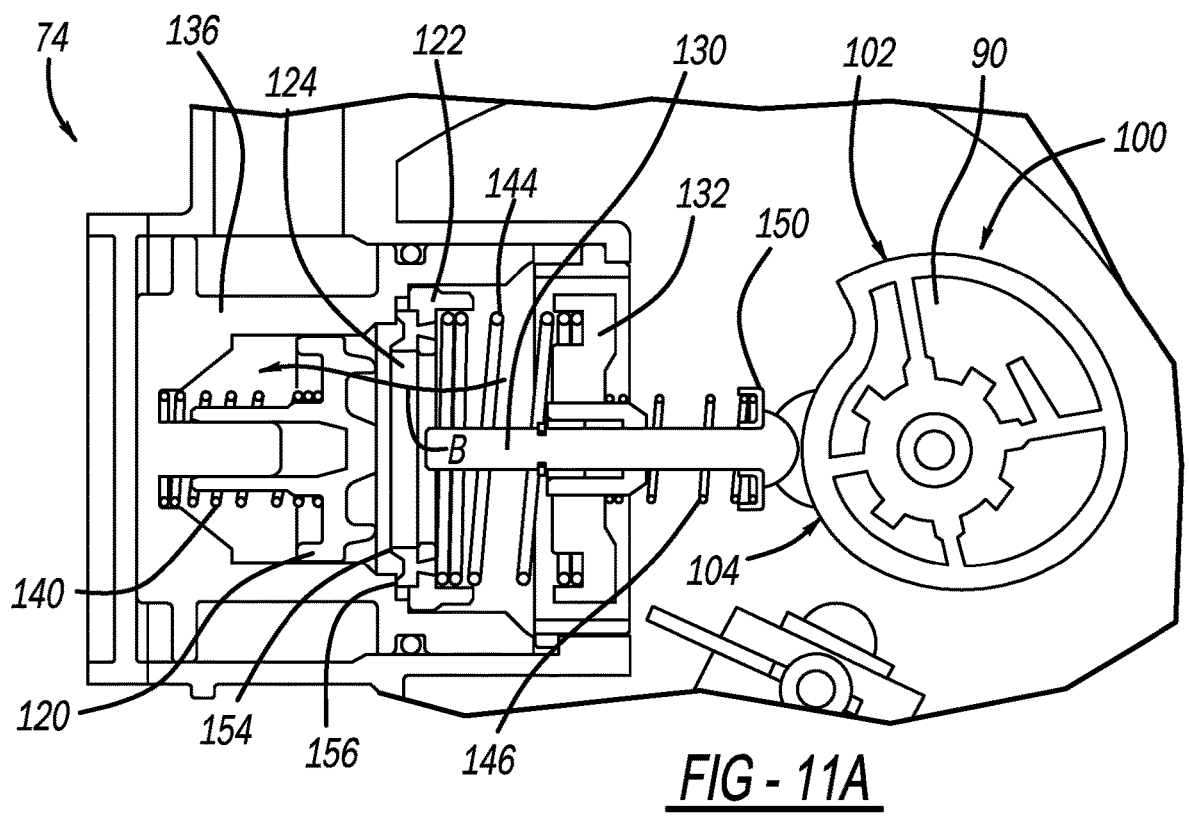
FIG. 11A is a first cross-sectional view of the poppet assembly during the conditions shown in FIGS. 7A and 7B.
Figure 11B:
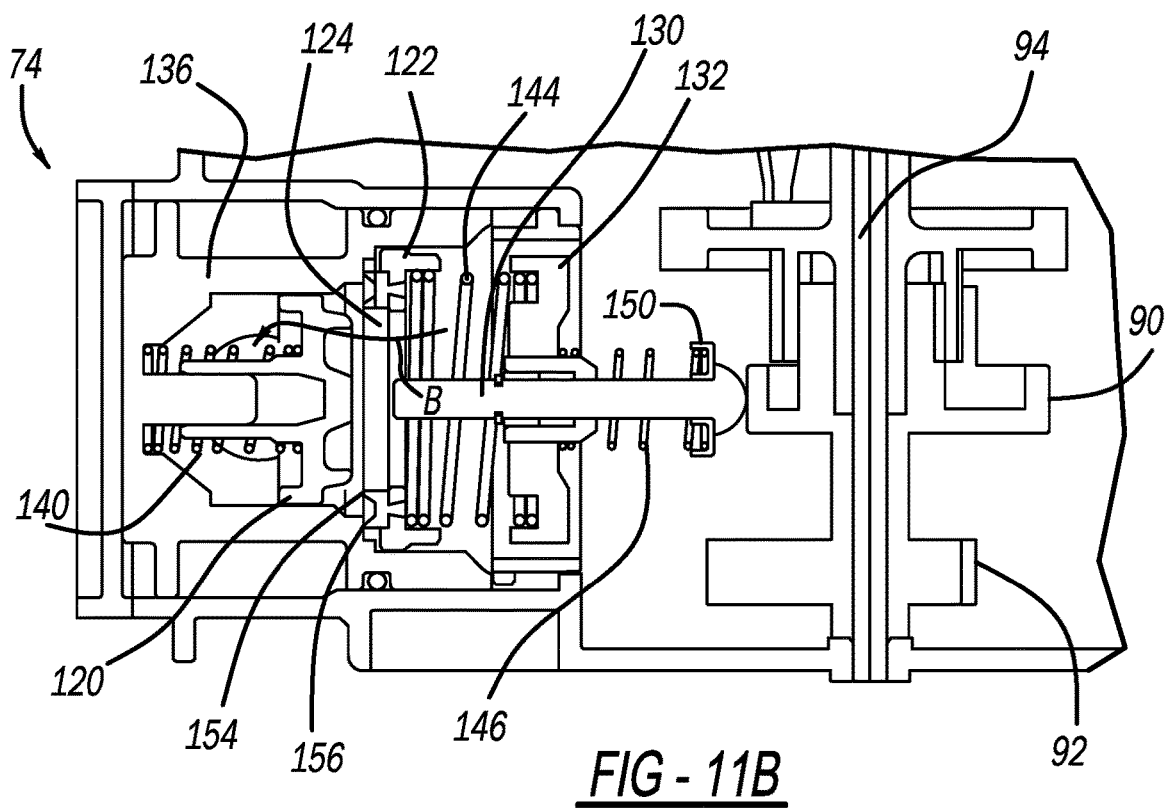
FIG. 11B is a second cross-sectional view of the poppet assembly during the conditions shown in FIGS. 7A and 7B.
Figure 12A:
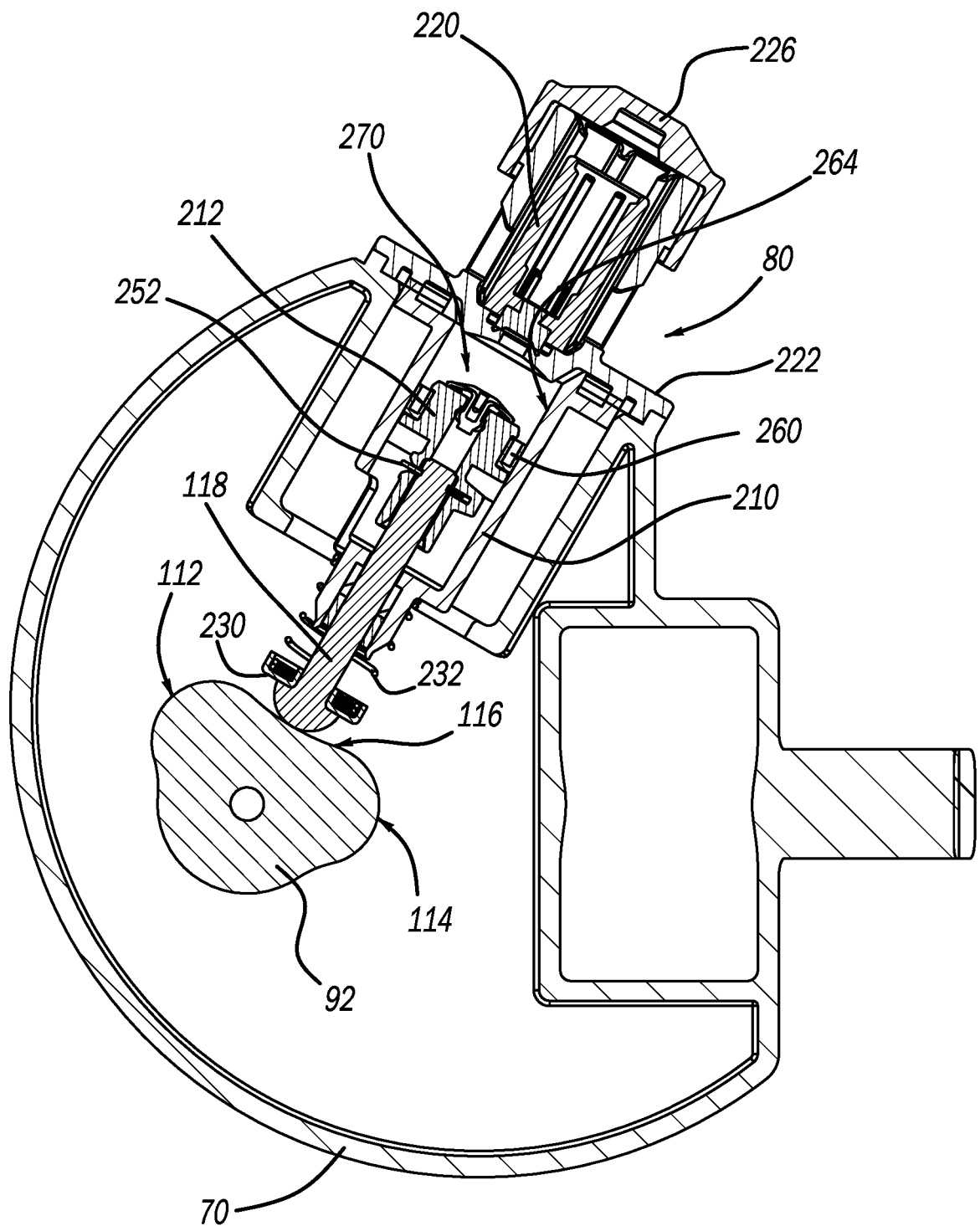
FIG. 12A is a cross-sectional view of the vent shut-off assembly taken through a pump and shown with a push pin 118 in an extended position.
Figure 12B:
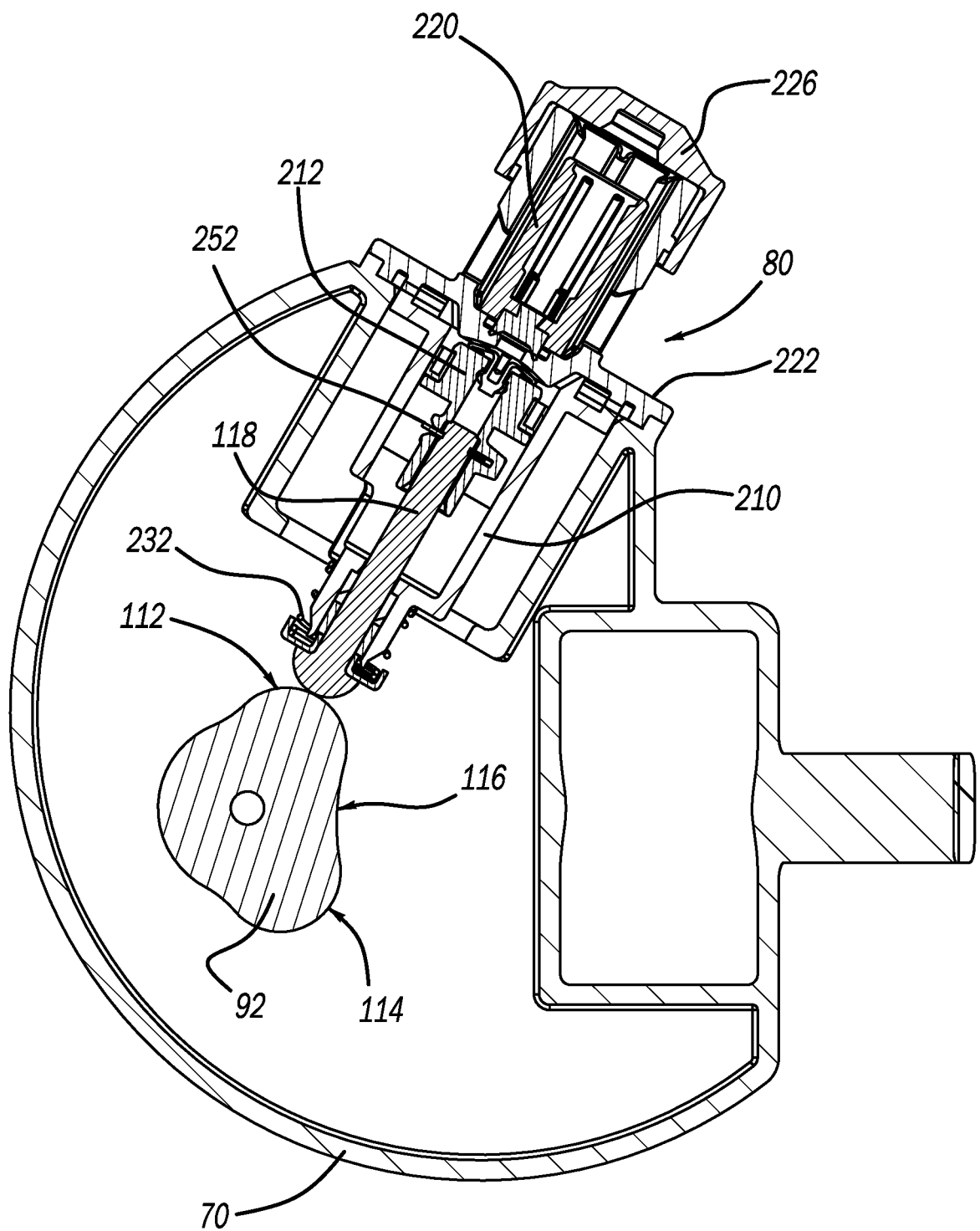
FIG. 12B is a cross-sectional view of the vent shut-off assembly taken through the pump and shown with the push pin 118 in a depressed position.
Figure 13B:
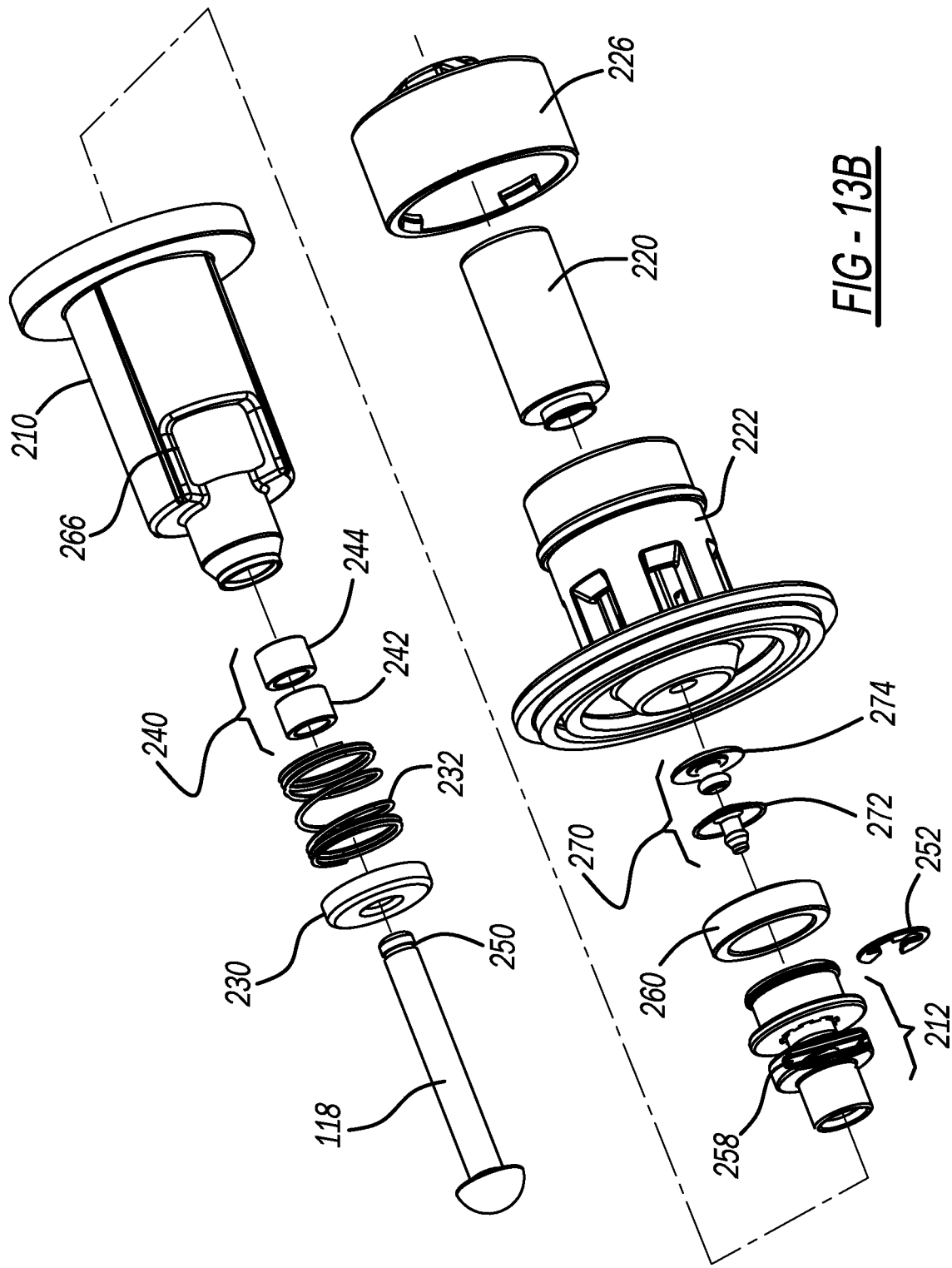
FIG. 13B is an exploded perspective view of the pump of FIG. 13A.
Figure 14A:
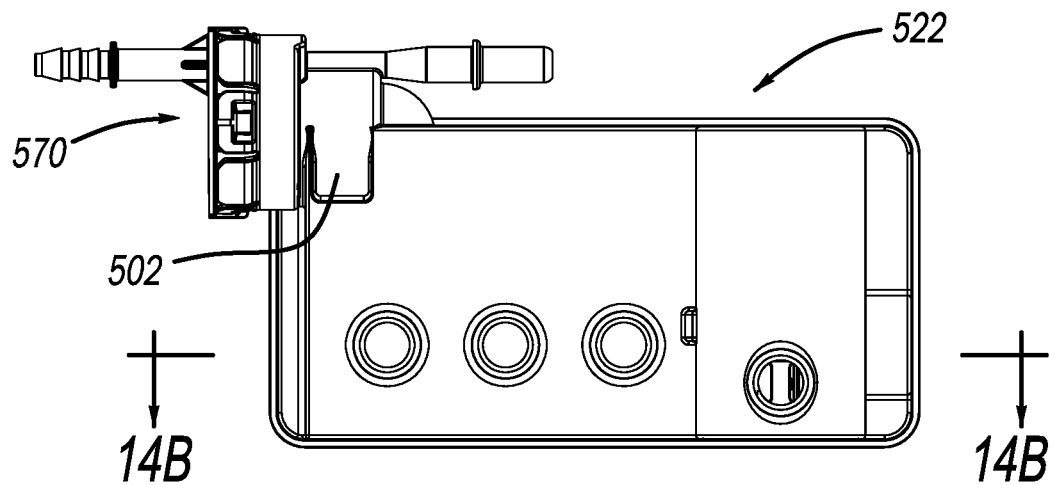
FIG. 14A is a bottom view of a vent shut-off assembly constructed in accordance to another example of the present disclosure.
Figure 14B:
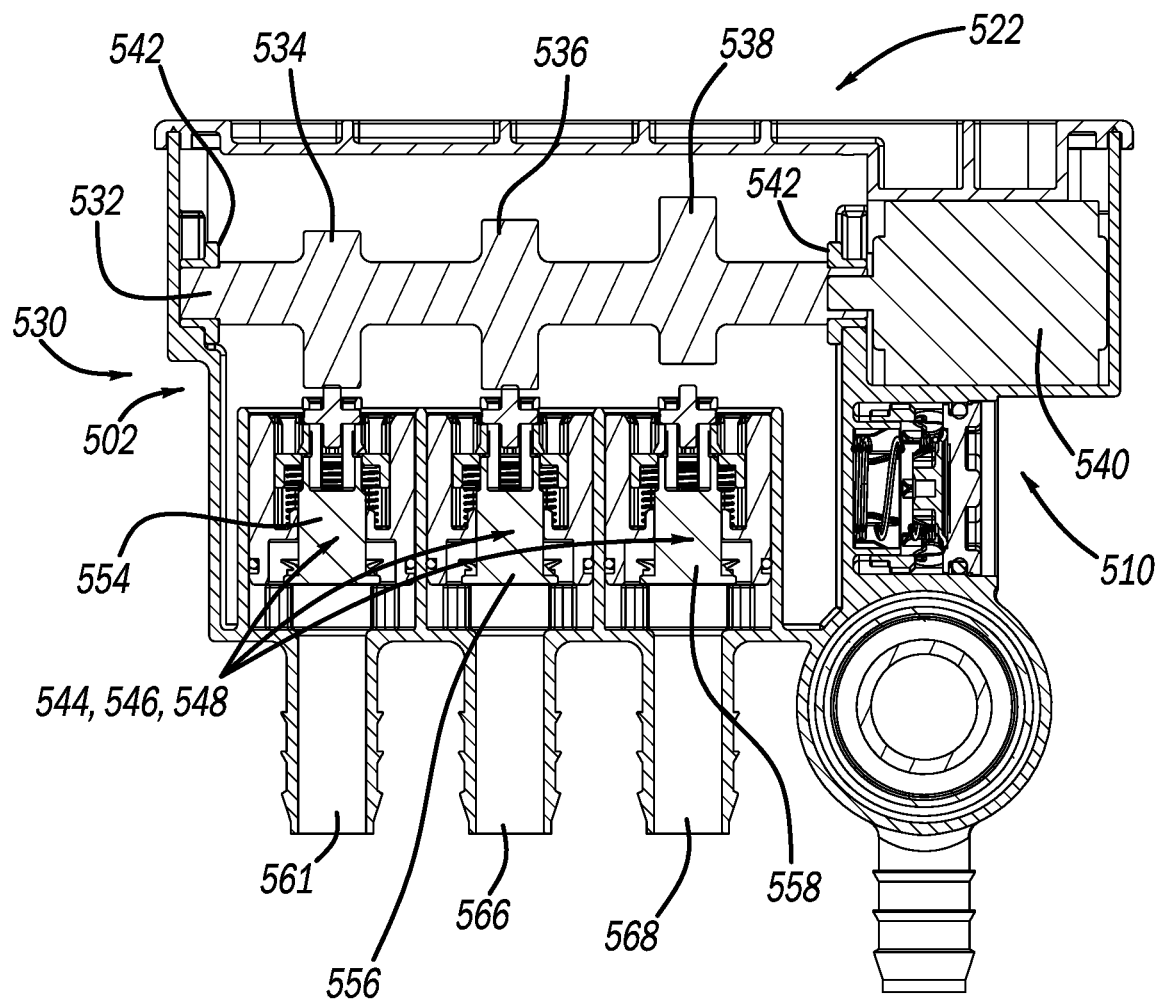
FIG. 14B is a cross-sectional view of the vent shut-off assembly of FIG. 14A taken along lines 14B-14B.
Figure 15A:
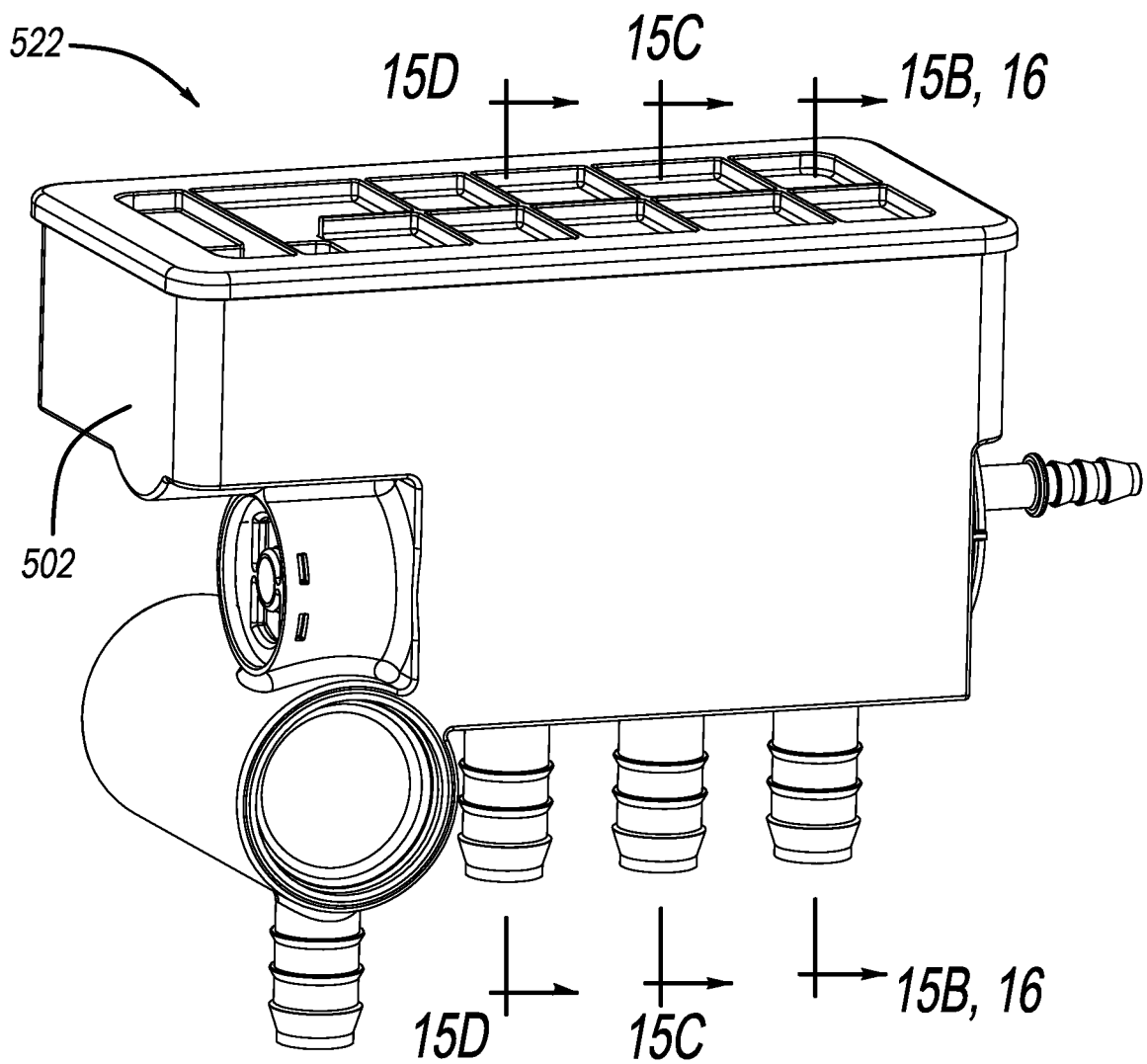
FIG. 15A is a front perspective view of the vent shut-off assembly of FIG. 14A.
Figure 15B:
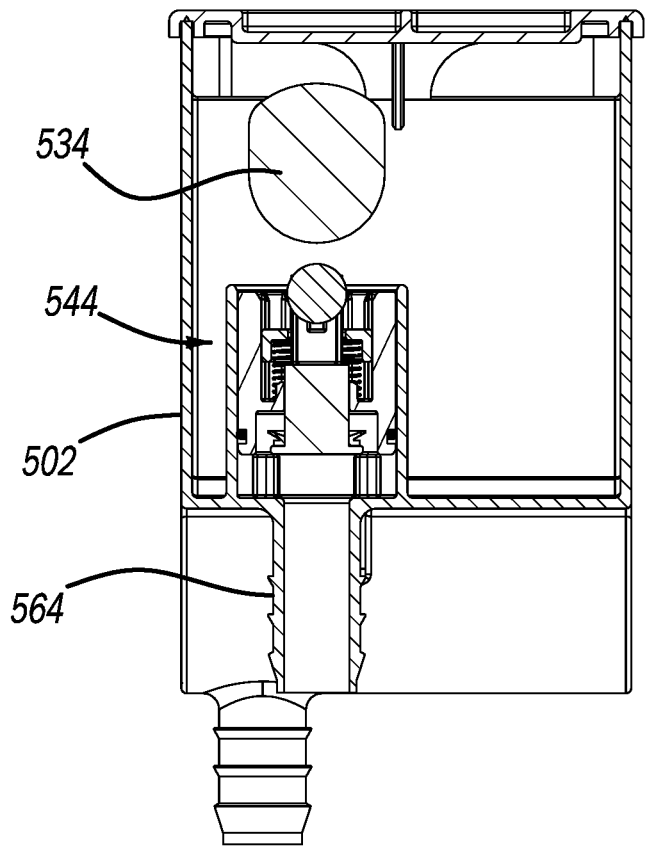
FIG. 15B is a cross-sectional view of the vent shut-off assembly of FIG. 15A taken along lines 15B-15B.
Figure 15C:
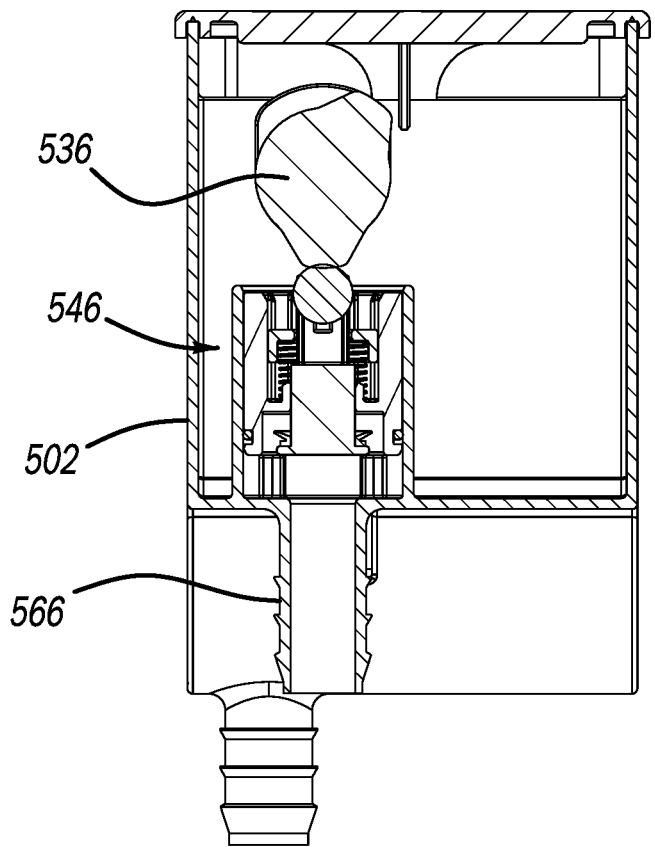
FIG. 15C is a cross-sectional view of the vent shut-off assembly of FIG. 15A taken along lines 15C-15C.
Figure 15D:
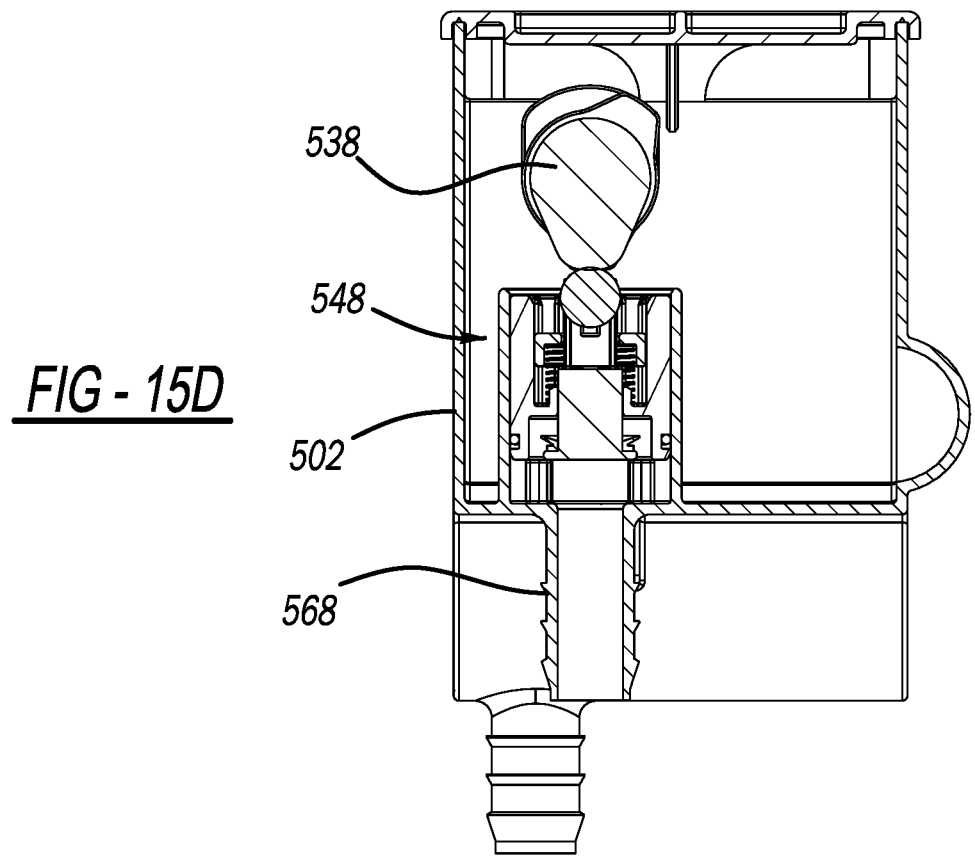
FIG. 15D is a cross-sectional view of the vent shut-off assembly of FIG. 15A taken along lines 15D-15D.
Figure 16:
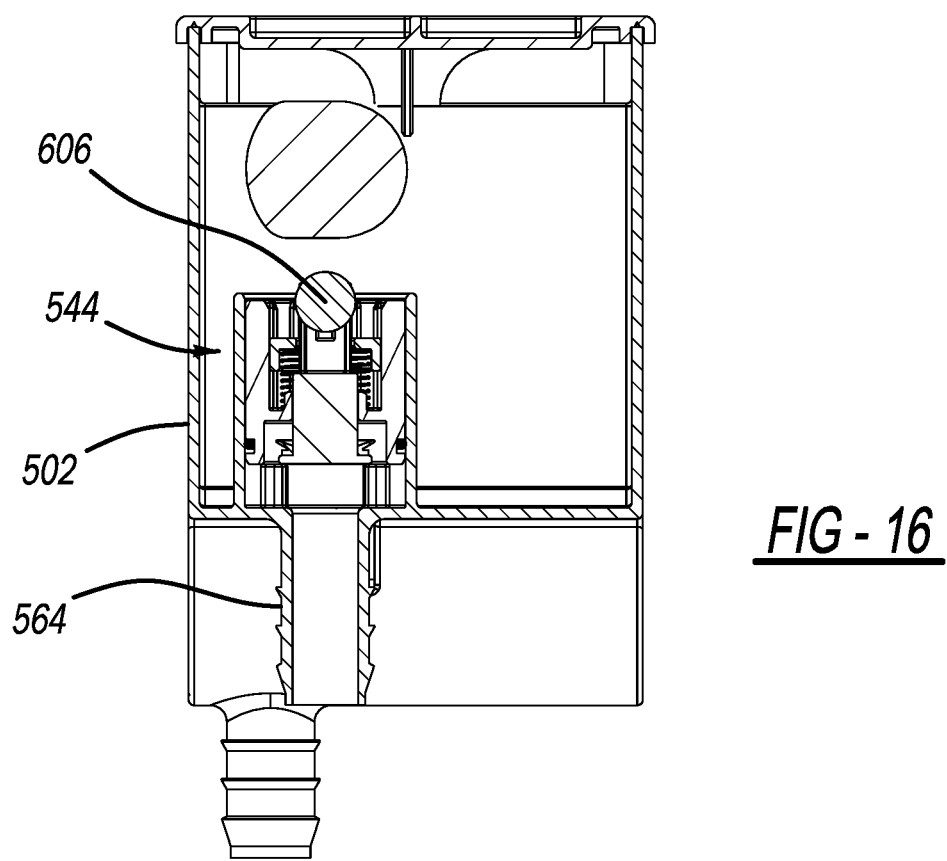
FIG. 16 is a cross-sectional view of the vent shut-off assembly of FIG. 15A taken along lines 16-16.

The cam assembly 76 generally includes a first or poppet cam 90 and a second or pump cam 92. The first and second cams 90, 92 are mounted for rotation with a cam shaft 94. A gear 96 is meshingly engaged with a complementary gear (not shown) extending from the motor 78. In other examples the gear 96 can be directly coupled for rotation with a motor drive shaft. The first cam 90 (see FIG. 8A) generally includes a cam surface 100 having a generally high lift surface 102 and a low lift surface 104. The second cam 92 (FIG. 12A) generally includes lift lobes 112, 114 separated by a valley 116. As will become appreciated herein, movement of the cam 92 causes a push pin 118 extending from the pump 80 to translate along its axis as it slidably negotiates along the cam 92 between the lift lobes 112, 114 and the valley 116 causing the pump 80 to pump liquid fuel out of the main housing 70. The push pin 118 is urged into engagement with the cam 92 by a pin biasing member 119.

Figures 4A, 4B:
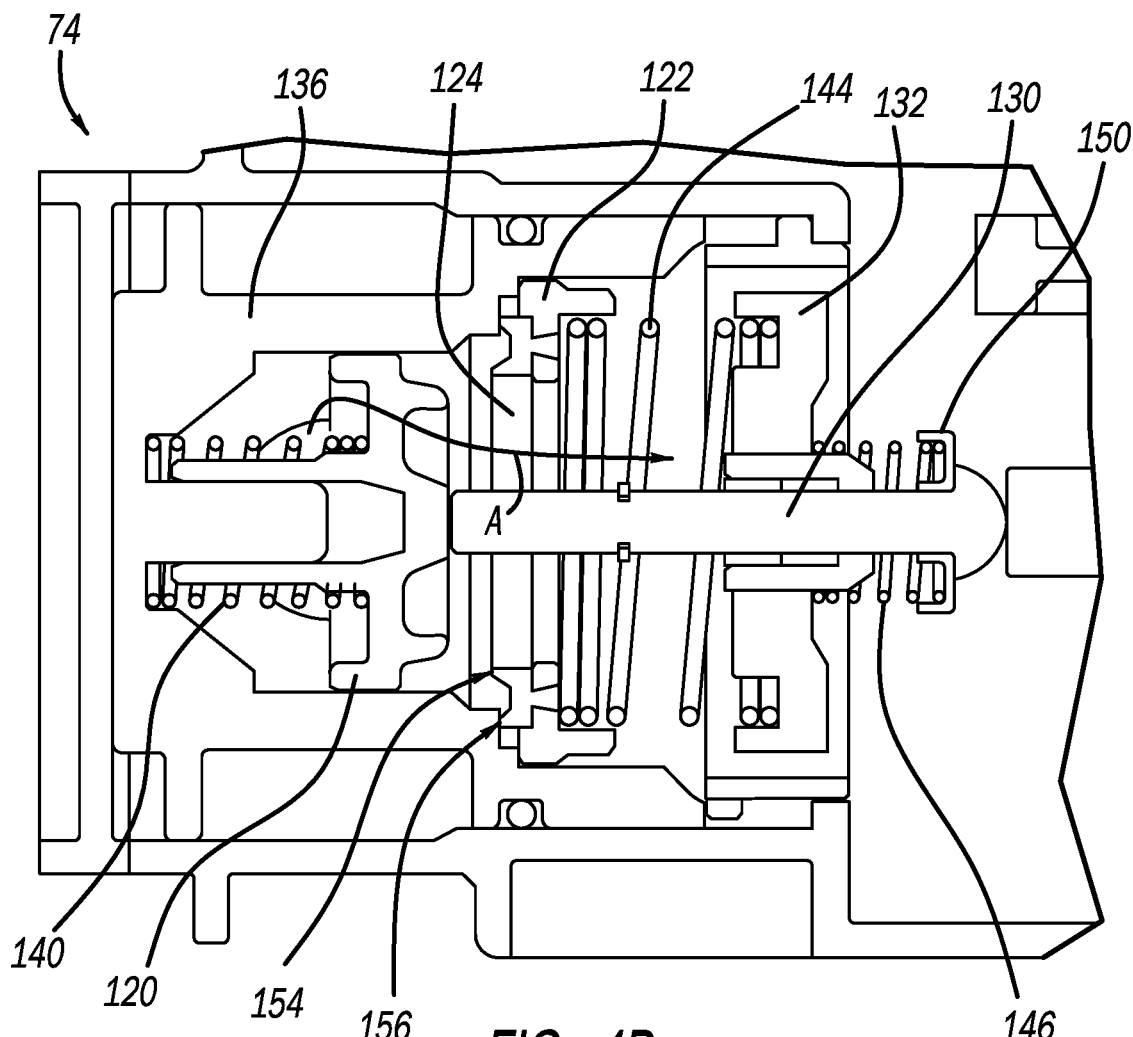
FIG. 4A is a table illustrating operating conditions for the poppet valve assembly shown in FIG. 4B.
FIG. 4B is a cross-sectional view of the poppet assembly during the conditions shown in FIG. 4A.
Figures 5A, 5B:
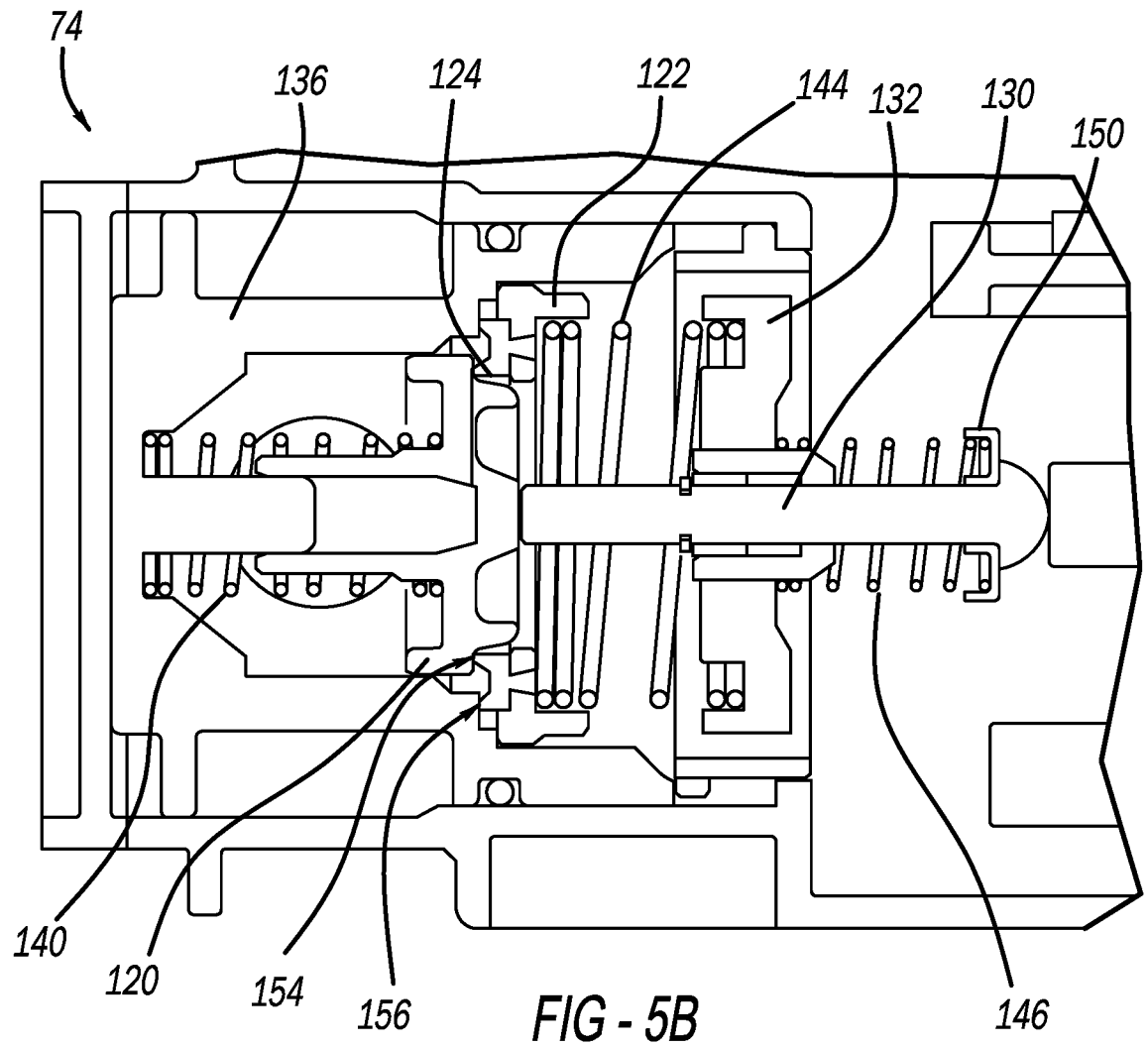
FIG. 5A is a table illustrating operating conditions for the poppet valve assembly shown in FIG. 5B.
FIG. 5B is a cross-sectional view of the poppet assembly during the conditions shown in FIG. 5A.

With additional reference now to FIG. 4B, the poppet valve assembly 74 will be further described. The poppet valve assembly 74 includes a poppet 120, a disk 122 that supports a seal member 124, a pin 130, a retainer 132 and a poppet carrier 136. A first biasing member 140 is biased between the poppet 120 and the carrier 136. A second biasing member 144 is biased between the disk 122 and the retainer 132. A third biasing member 146 is biased between the retainer 132 and a collar 150 on the pin 130. In some examples, the third biasing member 146 may be omitted as the first and second biasing members 140 and 144 may perform such function. The seal member 124 includes an inner lip seal 154 and an outer lip seal 156.

As will become appreciated from the following discussion, the poppet valve assembly 74 will be described as moving between fully open and closed positions for achieving various operating functions. However, the poppet valve assembly 74 and other components (such as the disk 122) can move to attain positons intermediate "fully open" and "fully closed". In this regard, it may be desirable, based on operating conditions, to vent the fuel tank 12 to the carbon canister 30 a predetermined amount between fully open and fully closed.

Figures 6A, 6B:
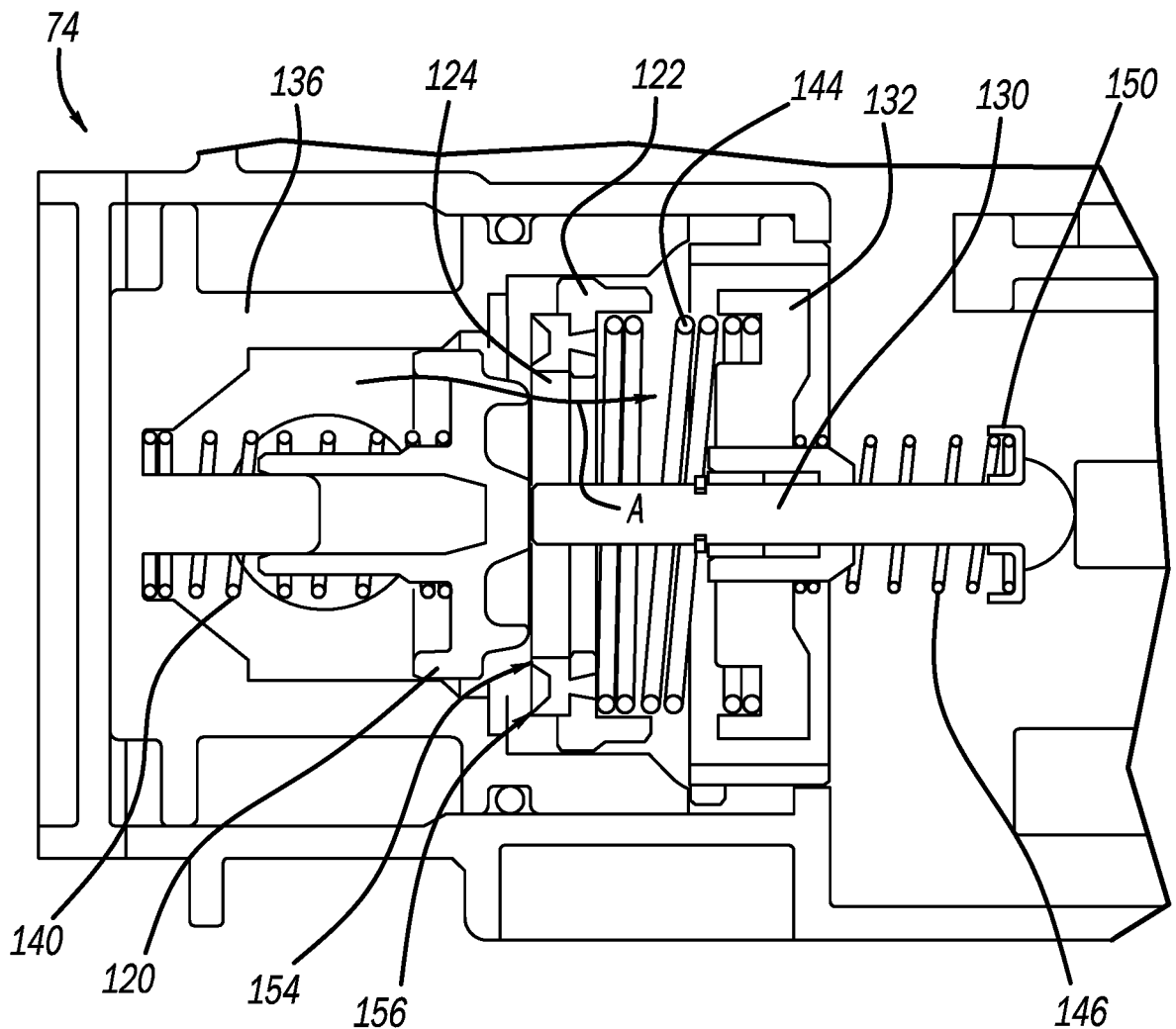
FIG. 6A is a table illustrating operating conditions for the poppet valve assembly shown in FIG. 6B.
FIG. 6B is a cross-sectional view of the poppet assembly during the conditions shown in FIG. 6A.
Figures 7A, 7B:
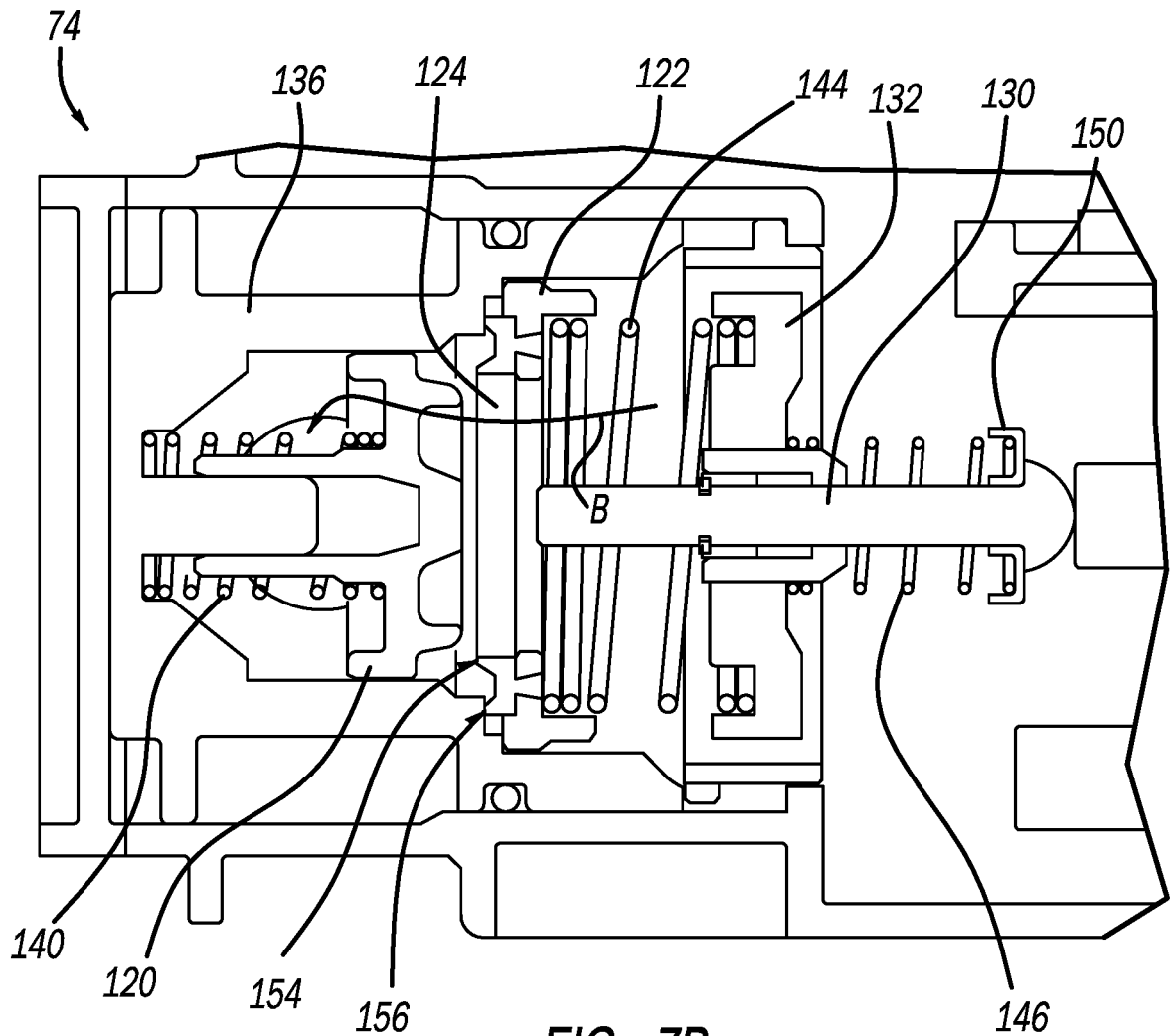
FIG. 7A is a table illustrating operating conditions for the poppet valve assembly shown in FIG. 7B.
FIG. 7B is a cross-sectional view of the poppet assembly during the conditions shown in FIG. 7A.

In general, the poppet valve 74 allows the vent shut-off assembly 22 to operate in various states, depending on operating conditions, to allow vapor to flow along a first path A (from the fuel tank 12 to the carbon canister 32) or a second path B (from the carbon canister 32 to the fuel tank 12). In one operating condition, vapor that enters at least one of the LVD valves 41A, 41B, 41C passes along at least one of the vapor lines 40, 42, 43 and enters the vent shut-off assembly 22. The operating state of the poppet valve 74, as described herein, allows the vapor to pass therethrough and out of the canister line port 73 to the carbon canister 32 (see flow path A, FIG. 2). Flow path A is desirable alleviate high pressure within the vapor space 18 of the fuel tank. Flow path A can also be desirable during a refueling event or other operating conditions that may cause pressure to rise above a threshold. As will become appreciated herein, the poppet valve 74 can be commanded to move (by the controller 30, FIGS. 4A, 4B) to achieve flow path A or, can automatically move to achieve flow path A (over pressure relief condition, FIGS. 6A, 6B). In another operating condition, fresh air is permitted to pass from the carbon canister 32, into the vent shut-off assembly 22. The operating state of the poppet valve 74 allows that fresh air to exit the vent shut-off assembly 22 through the vent line port 50 and backflow into the vapor space 18 through at least one of the LVD valves 41A, 41B, 41C. Flow path B is desirable to alleviate an undesirable vacuum condition within the vapor space 18 of the fuel tank 12.

With specific reference now to FIGS. 4A, 4B, 8A and 8B the poppet valve assembly 74 is shown during normal operation in a fully open position. Explained further, the first cam 90 is rotated to a position wherein the high lift surface 102 urges the pin 130 to be depressed or translated leftward as viewed in the FIGS. Translation of the pin 130 causes the poppet 120 to be lifted off of sealing engagement with the inner lip seal 154 of the seal member 124 and into the bias of the first biasing member 140. When the poppet 120 is in the open position, the vapor flow is permitted along flow path A into the vent line port 50 and out of the canister port 73. Fuel vapor from the vapor space 18 is caused to be vented to the canister 32.

With specific reference now to FIGS. 5A, 5B, 9A and 9B the poppet valve assembly 74 is shown during normal operation in a fully closed position. Explained further, the first cam 90 is rotated to a position wherein the low lift surface 104 aligned with the pin 130 such that bias of the first biasing member 140 causes the pin to be translated rightward as viewed in the FIGS. Translation of the pin 130 rightward causes the poppet 120 to attain a sealing engagement with the inner lip seal 154 of the seal member 124. When the poppet 120 is in the closed position, the vapor flow is inhibited from flowing into the vent line port 50 and out of the canister port 73. Fuel vapor from the vapor space 18 is precluded from venting to the canister 32. Flow along either of flow paths A or B is inhibited.

With reference now to FIGS. 6A, 6B, 10A and 10B, the poppet valve assembly 74 is shown during an over pressure relief (OPR) condition. In an OPR condition, pressure within the vapor space 18 of the fuel tank 18 has exceeded a threshold wherein vapor pressure in the fuel tank 12 is great enough to cause the seal member 124 to be lifted off of a sealed position with the carrier 136. In one example, the threshold can be around 14 kPa for a conventional fuel vehicle and around 37 kPa for a pressurized/hybrid vehicle. Explained further, the seal member 124 is caused to translate rightward as viewed in the FIGS. such that the outer lip seal 156 moves off of a sealed relationship with the carrier 136. The outer lip seal 156 acts as an OPR seal. In the OPR condition, fuel vapor from the vapor space 18 is caused to flow along flow path A and be vented to the canister 32. Notably, the seal member 124 can move rightward in an OPR condition without any command from the controller 30.

With reference now to FIGS. 7A, 7B, 11A and 11B, the poppet valve assembly 74 is shown during an over vacuum relief (OVR) condition. In an OVR condition, pressure within the vapor space 18 of the fuel tank 18 has dropped below a threshold wherein vapor pressure in the fuel tank is low enough to cause a vacuum wherein the poppet 120 is lifted off of sealing engagement with the inner lip seal 154 of the seal member 124 and into the bias of the first biasing member 140. When the poppet 120 is in the open position, the vapor flow is permitted to equalize pressures. In other words, vapor is permitted to flow along flow path B (from the canister 32 through the canister line 89) out of the vent line port 50 and into the vapor space 18. Notably, the poppet 120 can move leftward in an OVR condition without any command from the controller 30.

With reference now to FIGS. 12A-FIG. 14, the pump 80 will be further described. The pump 80 is configured to pump liquid fluid out of the vent shut off assembly 22. As will become appreciated, rotation of the cam assembly 76

(FIG. 3) ultimately actuates the pump 80. The pump 80 generally includes a piston housing 210, a piston 212, a check valve 220, a check valve housing 222 and a cap 226. The push pin 118 extends through a spring cap 230, a pump spring 232 and a bearing assembly 240 having bearings 242 and 244.

The push pin 118 further extends into the piston housing 210 and is coupled to the piston 212. In particular, the push pin 118 defines an annular recess 250 that receives a snap ring 252 thereat. The snap ring 252 can be inserted through a window 258 defined in the piston 212 to engage the push pin 118. The push pin 118 therefore engages the cam 92 on a first end and is fixed for translation with the piston on a second end. A seal 260 is received around an annular surface of the piston 212. The seal 260 slidably translates along an inner diameter 264 (FIG. 12A) of the piston housing 210 during pumping. An umbrella seal assembly 270 having an outer seal member 272 and an inner seal member 274 is disposed on an outboard end of the piston 212.

The piston housing 210 defines a housing window 266. The housing window 266 allows liquid fuel to enter the piston housing 210 where it can be pumped out of the vent shut off assembly 22. The window 266 can also be used to gain access to the pin 118 when assembling the snap ring 252 at the annular recess 250.

The check valve 220 can cooperate with the check valve housing 222 and the cap 224 to permit liquid fuel from exiting the check valve housing 222 (out of the vent shut off assembly 22) while inhibiting liquid fuel from entering the vent shut off assembly 22 (through the check valve housing 222). The check valve 220 can take many forms for accomplishing one way fluid flow. In this regard, the specific geometry shown in the FIGS is merely exemplary and other check valves may be used within the scope of this disclosure.

Operation of the pump 80 will now be described according to one exemplary method of operation. When the lift lobes 112 and 114 of the second cam 92 are aligned with the push pin 118 of the pump 80, fluid that may have passed through the LVD valves 41A, 41B and 41C, to be pumped out of the housing 70. When the valley 116 is aligned with the push pin 118, the biasing member 232 urges the push pin 118 to retract. When the push pin moves from the location shown in FIG. 12A to the position shown in FIG. 12B, liquid fuel in the piston housing 210 is urged by the piston 212 to be expelled into the check valve housing 222 where the check valve 220 permits the liquid fuel to exit the check valve housing 222 and ultimately the vent shut off assembly 22. The pump 80 can be a piston pump or any pump suitable to pump liquid fuel out of the vent shut off assembly 22. By way of example only, the pump can be configured to pump 1-3 cubic centimeters of liquid fuel per cycle and have a maximum pump rate of around 8.3 cubic centimeters per minute.

As identified above, the evaporative emissions control system 20 can replace conventional fuel tank systems that require mechanical components including in-tank valves with an electronically controlled module that manages the complete evaporative system for a vehicle. In this regard, some components that may be eliminated using the evaporative emissions control system 20 of the instant disclosure can include in-tank valves such as GVV's and FLVV's, canister vent valve solenoid and associated wiring, tank pressure sensors and associated wiring, fuel pump driver module and associated wiring, fuel pump module electrical connector and associated wiring, and vapor management valve(s) (system dependent). These eliminated components are replaced by the control module 30, vent shut-off assembly 22, manifold 24, and associated electrical connector 44. Various other components may be modified to accommodate the evaporative emissions control system 20 including the fuel tank 12. For example, the fuel tank 12 may be modified to eliminate valves and internal lines to pick-up points. The flange of the FDM 46 may be modified to accommodate other components such as the control module 30 and/or the electrical connector 44. In other configurations, the fresh air line of the canister 32 and a dust box may be modified. In one example, the fresh air line of the canister 32 and the dust box may be connected to the control module 30.

Turning now to FIGS. 14A-15A and 18, a vent shut-off assembly constructed in accordance to additional features of the present disclosure is shown and generally identified at reference 522. As will become appreciated from the following discussion, the vent shut off assembly 522 can be configured for use with a fuel tank for a hybrid vehicle. A fuel tank system for a hybrid vehicle can include a fuel tank isolation valve (FTIV) that includes built in OPR and OVR. The vent shut-off assembly 522 according to the present disclosure incorporates OPR and OVR. In this regard, the vent shut-off assembly 522 can be used on fuel tanks configured for use with hybrid powertrains. As will become appreciated from the following discussion, the vent shut-off assembly 522 is similar to the vent shut-off assembly 22 however the vent shut-off assembly 522 has dedicated cams and poppets for each of the LVD valves 41A, 41B and 41C.

Figure 18:
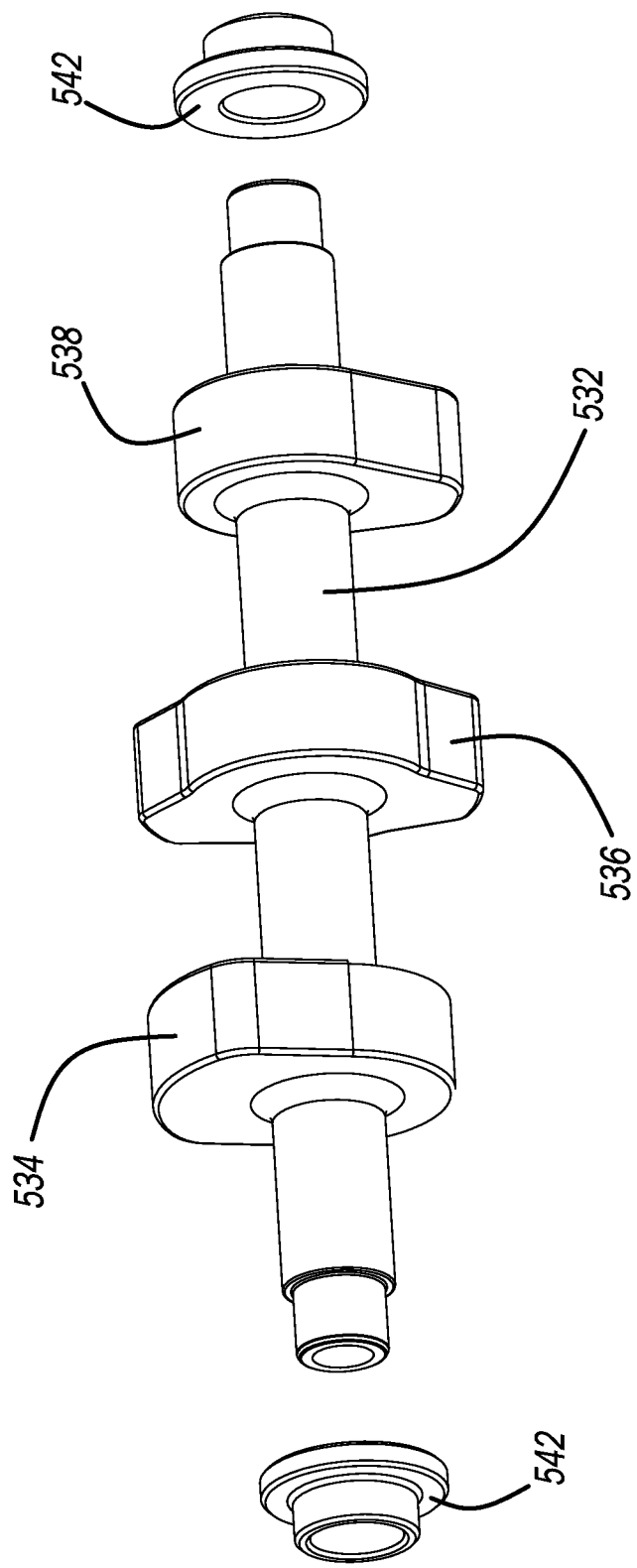
FIG. 18 is an exploded perspective view of a camshaft assembly of the vent shut-off assembly of FIG. 14A.

The vent shut-off assembly 522 includes a main housing 502 that at least partially houses an actuator assembly 510. A canister vent line (not shown but see canister vent line 89, FIG. 1) routes to the canister (see canister 32, FIG. 1). The vent shut-off assembly 522 includes a cam assembly 530. The cam assembly 530 includes a cam shaft 532 that includes cams 534, 536 and 538. The cam shaft 532 is rotatably driven by a motor 540 and can be supported in the housing 502 on opposite ends by grommets 542 (FIG. 18). In the example shown the motor 540 is received in the housing 502. The motor 540 is a direct current motor that directly drives the camshaft 532. Other configurations are contemplated. The cams 534, 536 and 538 rotate to interact with respective plunger assemblies (or poppet valve assemblies) 544, 546 and 548 to open and close valves 554, 556 and 558, respectively. The valves 554, 556 and 558 open and close to selectively deliver vapor through ports 564, 566 and 568, respectively. In one example the motor 540 can alternately be a stepper motor. An active drain liquid trap (ADLT) 570 can be provided on the housing 502.

As will be described herein, each of the plunger assemblies 544, 546 and 548 are configured as poppet valves with spring return. With spring return, these plunger assemblies 544, 564 and 548 provide a pressure relief function. In other words, if a pressure experienced on one side of the poppet valve is large enough to overcome a bias of an oppositely acting spring, the valve will open to relieve the pressure.

Figure 17:
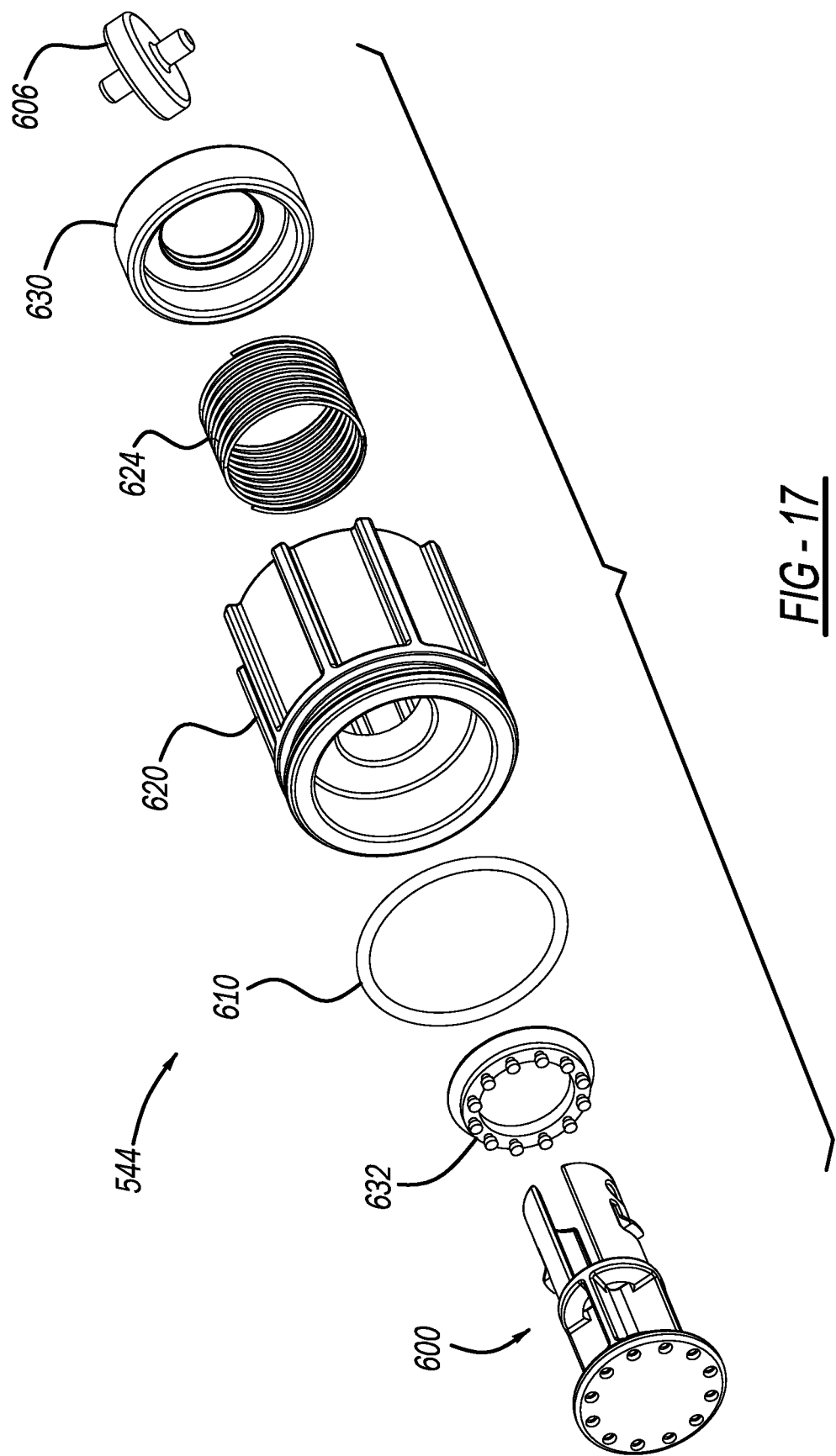
FIG. 17 is an exploded perspective view of a plunger assembly of the vent shut-off assembly of FIG. 14A.

With reference now to FIG. 17, a plunger assembly 544 is shown in exploded view. Description of the plunger assembly 544 will now be explained with the understanding that the plunger assemblies 546 and 548 are similarly constructed. The plunger assembly 544 includes a stem assembly 600, a roller 606, an O-ring 610, a plunger housing 620, a first biasing member 624 and a collar 630. The stem assembly 600 can include a seal 632 disposed around a stem body 634.

Figure 19A:
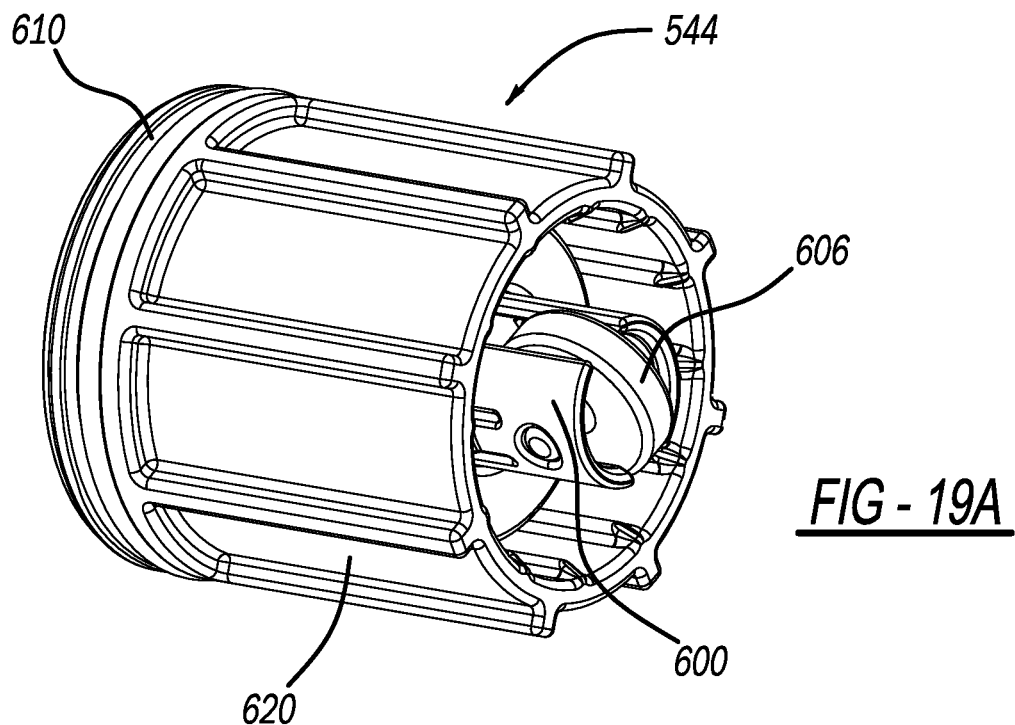
FIG. 19A is a first perspective view of a plunger assembly of the vent shut-off assembly of FIG. 14A.
Figure 19B:
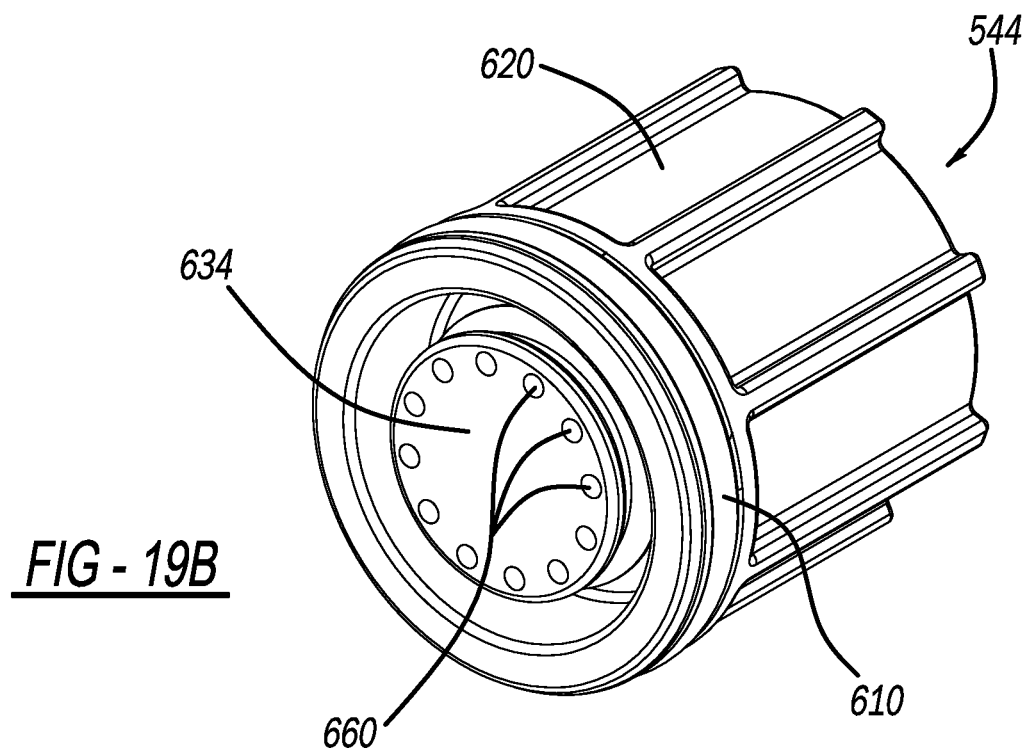
FIG. 19B is a second perspective view of the plunger assembly of FIG. 19A.
Figure 19C:
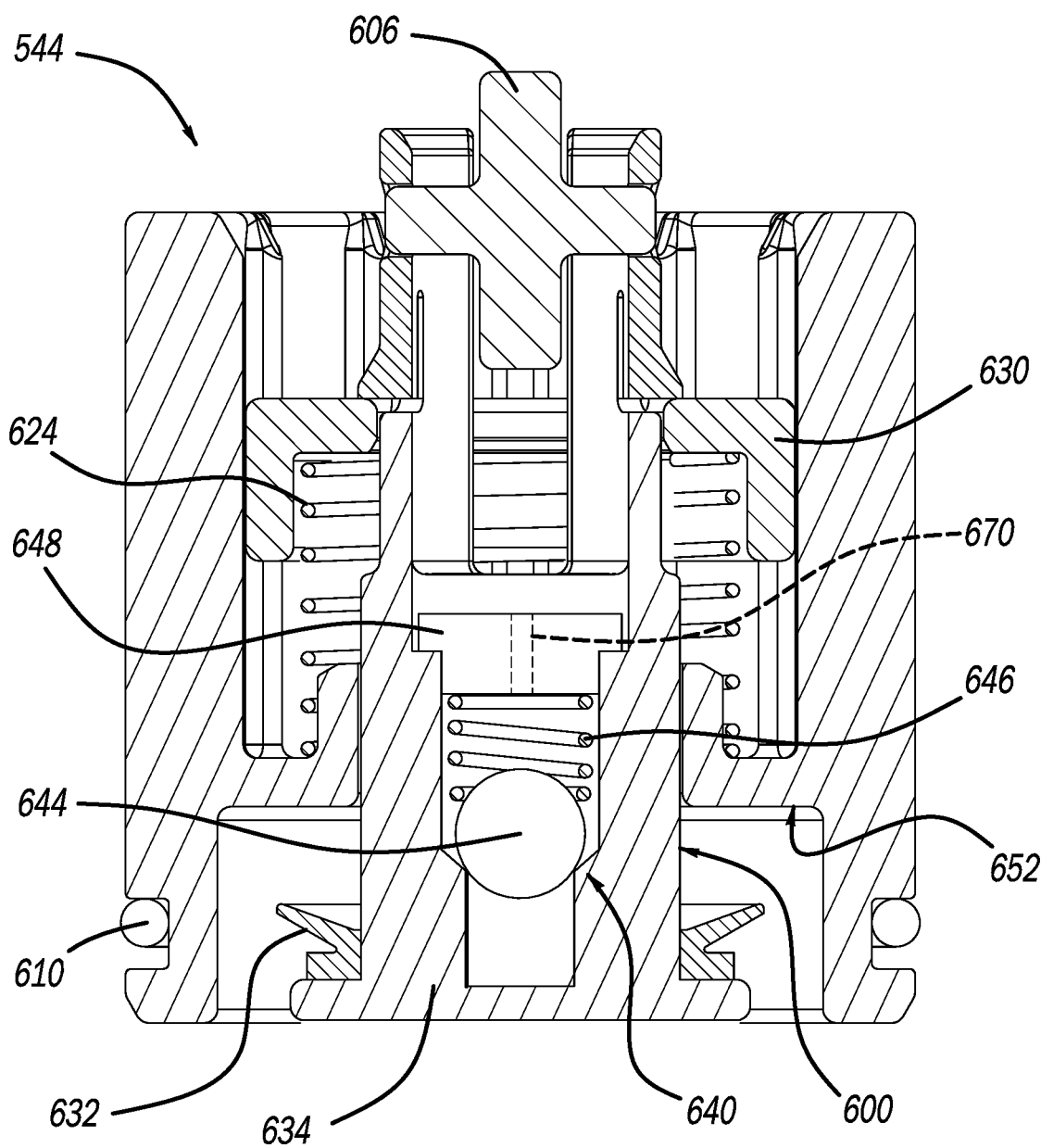
FIG. 19C is a sectional view of the plunger assembly of FIG. 19A.

As shown in FIGS. 19A-19C, the plunger sub-assembly 544 can also include an OPR check valve 640. The OPR check valve 640 can include a ball 644, a second biasing member 646 and a disk 648. During operation, the seal 632 of the plunger assembly 544 is normally sealed against a seat 652 on the plunger housing 620. No vapor can pass through plunger assembly 544 in the sealed position. The first biasing member 624 will urge the collar 630 upward (as viewed from FIG. 19C) urging the stem body 634 upward and the seal 632 against the seat 652. It is appreciated that the first biasing member 624 is permitted to urge the collar 630 when the cam 534 is not urging the roller 606 downward. In other words, the cam 534 is sufficiently in a no lift position. If enough pressure builds against an upper surface (as viewed in FIG. 19C) of the collar 630 to overcome the bias of the first biasing member 624, the plunger assembly 544 can open by moving the stem assembly 600 downward and urging the seal 632 off of the seat 652.

If a predetermined pressure is reached in the vapor dome within the fuel tank (see fuel tank 12, FIG. 1), the OPR check valve 640 will open. Specifically, the ball 644 will urge the second biasing member 646 upward. As the ball 644 moves upward, the ball 644 moves off of a ball seat 664 on the stem body 634 allowing fuel vapor to be relieved from the vapor dome of the fuel tank through passages 660 (FIG. 19B) of the stem body 634, around the ball 644 and through a corresponding passage 670 (FIG. 19C) in the disk 648. The passages 660 can be formed anywhere on the stem body 634. In sum, the plunger assembly 544 can incorporate an OPR/OVR relief function in both directions to relieve pressure on opposite ends of the plunger assembly 544. In other advantages, the OPR/OVR relief function is mechanically operable independent of power supply. In this regard, the OPR/OVR relief will work subsequent to power loss in the vehicle.

In some examples, the OPR check valve functionality can be incorporated on only the plunger assembly 544. In other examples, an OPR check valve can be additionally or alternatively incorporated on the plunger assemblies 546 and 548. In other arrangements the OPR/OVR functionality can be incorporated elsewhere on the vent shut-off assembly 522 such as through the housing 502. In yet other configurations, the OPR/OVR mechanism can be provided as a snorkel out of the housing 502. The snorkel can be routed to the center of the fuel tank and most likely to always see vapor. In another configuration, the OPR/OVR mechanism can be incorporated into a vapor line leaving the fuel tank downstream of the in-line liquid vapor discriminating (LVD) valve that is part of the vent shut-off assembly 522. The OPR/OVR can also be incorporated into the LVD that is part of the vent shut-off assembly 522. The OPR/OVR can be incorporated at the exit of the ADLT 570. As explained above, the vent shut-off assembly 522 provides an OVR function at each of the plunger assemblies 544, 546 and 548.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A vent shut-off assembly configured to manage venting on a fuel tank system configured to deliver fuel to an internal combustion engine, the vent shut-off assembly comprising:
a carbon canister adapted to collect fuel vapor emitted by the fuel tank and to subsequently release the fuel vapor to the engine;
an actuator assembly including a motor drive that rotates a camshaft having at least a first cam and a second cam disposed in a housing, the actuator assembly having:
a first plunger assembly that selectively fluidly connects the fuel tank and the carbon canister;
a second plunger assembly that selectively fluidly connects the fuel tank and the carbon canister; and
one of an over pressure relief (OPR) valve and over vacuum relief (OVR) valve configured at the first plunger assembly.

2. The vent shut-off assembly of claim 1 wherein the vent shut-off assembly further comprises:
a third cam provided on the camshaft;
a third plunger assembly that selectively fluidly connects the fuel tank and the carbon canister.

3. The vent shut-off assembly of claim 1 wherein the first plunger assembly comprises a stem assembly, a roller, a plunger housing, a first biasing member and a collar and wherein the stem assembly includes a seal disposed around a stem body, wherein the seal of the stem assembly is normally sealed against a seat on the plunger housing.

4. The vent shut-off assembly of claim 3 wherein the first plunger includes an OPR check valve having a ball, a second biasing member and a disk.

5. The vent shut-off assembly of claim 4 wherein the OPR check valve is configured to open upon a predetermined pressure being reached in the vapor dome.

6. The vent shut-off assembly of claim 5 wherein the ball urges the second biasing member in the second direction upon the predetermined pressure being reached, wherein the ball moves off of a ball seat on the stem body allowing fuel vapor to be relieved from the vapor dome of the fuel tank through a passage defined in the stem body.

7. The vent shut-off assembly of claim 3 wherein the first biasing member is configured to urge the collar in a first direction thereby urging the stem body in the first direction and moving the seal against the seat.

8. The vent shut-off assembly of claim 7 wherein the plunger assembly is configured to open by moving the stem assembly in a second direction, opposite the first direction, urging the seal off of the seat upon a threshold pressure building against the collar that overcomes a bias of the first biasing member.

9. The vent shut-off assembly of claim 1 wherein the fuel tank system is pressurized.

10. The vent shut-off assembly of claim 9 wherein the fuel tank system is configured for use on a hybrid powertrain vehicle.

11. A vent shut-off assembly configured to manage venting on a fuel tank system configured to deliver fuel to an internal combustion engine, the fuel tank system including a carbon canister adapted to collect fuel vapor emitted by the fuel tank and to subsequently release the fuel vapor to the engine, the vent shut-off assembly comprising:
a housing;
an actuator assembly disposed in the housing and including a motor drive that rotates a camshaft having at least a first cam and a second cam disposed in a housing, the actuator assembly having:
a first plunger assembly that selectively fluidly connects the fuel tank and the carbon canister;
a second plunger assembly that selectively fluidly connects the fuel tank and the carbon canister; and one of an over pressure relief (OPR) valve and over vacuum relief (OVR) valve configured at the first plunger assembly.

12. The vent shut-off assembly of claim 11 wherein the vent shut-off assembly further comprises:
a third cam provided on the camshaft;
a third plunger assembly that selectively fluidly connects the fuel tank and the carbon canister.

13. The vent shut-off assembly of claim 11 wherein the first plunger assembly comprises a stem assembly, a roller, a plunger housing, a first biasing member and a collar and wherein the stem assembly includes a seal disposed around a stem body, wherein the seal of the stem assembly is normally sealed against a seat on the plunger housing.

14. The vent shut-off assembly of claim 13 wherein the first plunger includes an OPR check valve having a ball, a second biasing member and a disk.

15. The vent shut-off assembly of claim 14 wherein the OPR check valve is configured to open upon a predetermined pressure being reached in the vapor dome.

16. The vent shut-off assembly of claim 15 wherein the ball urges the second biasing member in the second direction upon the predetermined pressure being reached, wherein the ball moves off of a ball seat on the stem body allowing fuel vapor to be relieved from the vapor dome of the fuel tank through a passage defined in the stem body.

17. The vent shut-off assembly of claim 13 wherein the first biasing member is configured to urge the collar in a first direction thereby urging the stem body in the first direction and moving the seal against the seat.

18. The vent shut-off assembly of claim 17 wherein the plunger assembly is configured to open by moving the stem assembly in a second direction, opposite the first direction, urging the seal off of the seat upon a threshold pressure building against the collar that overcomes a bias of the first biasing member.

19. The vent shut-off assembly of claim 11 wherein the fuel tank system is pressurized.

20. The vent shut-off assembly of claim 19 wherein the fuel tank system is configured for use on a hybrid powertrain vehicle.

* * * * *